US012233429B2

(12) United States Patent
Lewis et al.

(10) Patent No.: US 12,233,429 B2
(45) Date of Patent: Feb. 25, 2025

(54) FLUID DISPENSING PROCESS CONTROL USING MACHINE LEARNING AND SYSTEM IMPLEMENTING THE SAME

(71) Applicant: NORDSON CORPORATION, Westlake, OH (US)

(72) Inventors: Alan R. Lewis, Carlsbad, CA (US); Cutler Crowell, III, San Marcos, CA (US); Michael Gorman, Oceanside, CA (US); Akira Morita, San Diego, CA (US)

(73) Assignee: Nordson Corporation, Westlake, OH (US)

( * ) Notice: Subject to any disclaimer, the term of this patent is extended or adjusted under 35 U.S.C. 154(b) by 223 days.

(21) Appl. No.: 17/904,299

(22) PCT Filed: Feb. 19, 2021

(86) PCT No.: PCT/US2021/018664
§ 371 (c)(1),
(2) Date: Aug. 16, 2022

(87) PCT Pub. No.: WO2021/168174
PCT Pub. Date: Aug. 26, 2021

(65) Prior Publication Data
US 2023/0060352 A1 Mar. 2, 2023

Related U.S. Application Data

(60) Provisional application No. 62/978,966, filed on Feb. 20, 2020.

(51) Int. Cl.
*G01N 15/14* (2024.01)
*B05B 12/08* (2006.01)
(Continued)

(52) U.S. Cl.
CPC .......... *B05B 12/082* (2013.01); *B05C 5/0225* (2013.01); *B05C 11/1007* (2013.01); *G01N 15/1459* (2013.01); *G06T 7/0004* (2013.01)

(58) Field of Classification Search
None
See application file for complete search history.

(56) References Cited

U.S. PATENT DOCUMENTS 4,878,064 A * 10/1989 Katerberg ............... B41J 2/115
347/78
5,505,777 A * 4/1996 Ciardella ............. B23K 3/0607
118/712
(Continued)

FOREIGN PATENT DOCUMENTS

CN 108672218 A 10/2018
EP 3586973 A1 * 1/2020 ............. B05B 12/08
(Continued)

OTHER PUBLICATIONS

West et al.; "Experience of the application of intelligent control paradigms to real manufacturing processes"; Proceedings of the Institution Mechanical Engineers Part 1: Journal of Systems and Control Engineering; vol. 209; 1995; p. 293-308.
(Continued)

*Primary Examiner* — Paul R Durand
*Assistant Examiner* — Michael J. Melaragno
(74) *Attorney, Agent, or Firm* — BakerHostetler

(57) ABSTRACT

Systems and methods for improved fluid dispensing process control using a machine learning tool are disclosed. In an example method, successive portions of viscous fluid are dispensed by a dispensing device according to operating parameters to train a machine learning tool to associate defect classifications with images of dispensed portions and/or operating parameters associated with dispensing the dispensed portions. The trained machine learning tool is then
(Continued)

used in a closed loop fashion in production to detect and correct for defects associated with the dispensed portions to improve quality and production efficiency.

50 Claims, 13 Drawing Sheets

(51) Int. Cl.
  *B05C 5/02* (2006.01)
  *B05C 11/10* (2006.01)
  *G06T 7/00* (2017.01)

(56) References Cited

U.S. PATENT DOCUMENTS

| | | | | |
|---|---|---|---|---|
| 6,186,610 | B1* | 2/2001 | Kocher | B41J 2/04516 347/14 |
| 6,276,774 | B1* | 8/2001 | Moghadam | B41J 2/04551 347/81 |
| 6,925,346 | B1* | 8/2005 | Mazumder | B23K 35/0244 700/121 |
| 8,255,088 | B2* | 8/2012 | Burkus, II | B05C 5/0225 702/98 |
| 8,430,059 | B2* | 4/2013 | Mickley | G05B 19/25 118/410 |
| 8,562,095 | B2* | 10/2013 | Alleyne | B41J 2/06 347/14 |
| 9,278,522 | B2* | 3/2016 | Alleyne | B41J 2/04576 |
| 9,841,750 | B2* | 12/2017 | Willis | G05B 19/4099 |
| 10,046,351 | B2* | 8/2018 | Brudevold | F04B 49/065 |
| 2002/0089561 | A1* | 7/2002 | Weitzel | G01F 17/00 347/19 |
| 2019/0061049 | A1* | 2/2019 | Kubo | B23K 26/032 |
| 2019/0235481 | A1* | 8/2019 | Takigawa | G05B 23/024 |
| 2019/0384329 | A1* | 12/2019 | Cybulsky | G05D 7/0635 |
| 2023/0060352 | A1* | 3/2023 | Lewis | G06F 18/241 |

FOREIGN PATENT DOCUMENTS

| | | | | |
|---|---|---|---|---|
| EP | 4107479 A1 | 12/2022 | | |
| WO | WO-2009070568 A1 * | 6/2009 | | B05C 11/1005 |
| WO | 2019/094282 A1 | 5/2019 | | |
| WO | WO-2019084348 A1 * | 5/2019 | | B05C 11/1026 |

OTHER PUBLICATIONS

ISA/220—Notification of Transmittal or Search Report and Written Opinion of the ISA, or the Declaration Mailed on Jun. 7, 2021 for WO Application No. PCT/US21/018664.

* cited by examiner

FLUID DISPENSING PROCESS CONTROL USING MACHINE LEARNING AND SYSTEM IMPLEMENTING THE SAME

CROSS REFERENCE TO RELATED APPLICATIONS

This application is a National Stage Application of International Patent Application No. PCT/US2021/018664, filed Feb. 19, 2021, which claims the benefit of U.S. Provisional Patent Application No. 62/978,966, filed Feb. 20, 2020, the entire disclosures of both of which are hereby incorporated by reference as if set forth in their entirety herein.

TECHNICAL FIELD

This disclosure generally relates to the jetting of fluid materials and, in particular, to systems and methods for improved fluid dispensing process control using machine learning.

BACKGROUND

Jetting valves are used in electronic packaging assembly, as well as other processes, to jet minute dots or droplets, streams, and/or discontiguous volumes of a viscous or fluid material onto a substrate. Numerous applications exist for jetting valves that jet fluid materials, such as those concerning underfill materials, encapsulation materials, surface mount adhesives, solder pastes, conductive adhesives, solder mask materials, fluxes, thermal compounds, and/or the like.

A "jetting valve" or "jetting device" is a device which ejects, or "jets", a droplet, stream, and/or discontiguous volume of material from the jetting device to land on a substrate, wherein the droplet, stream, and/or discontiguous volume may disengage from the nozzle of the jetting device before making contact with the substrate. Thus, in this type of jetting device, the droplet, stream, and/or discontiguous volume of material may be dispensed "in-flight" between the jetting device and the substrate, and not in contact with either the jetting device or the substrate, for at least a part of the distance between the jetting device and the substrate.

A jetting device may also refer to a device that ejects a droplet, stream, and/or discontiguous volume of material such that the droplet, stream, and/or discontiguous volume of material is in contact with the nozzle and the substrate simultaneously. The momentum of the fluid may be the primary factor for transporting the fluid from the nozzle to the substrate, as well as the primary mechanism for causing the separation of the droplet, stream, and/or discontiguous volume of material from the nozzle. In this case, the material is delivered to the substrate without depending on adhesion of the droplet, stream and/or discontiguous volume of material to the substrate to pull the droplet, stream or discontiguous volume of material away from the nozzle of the jetting device.

Yet operation of a dispensing device, including a jetting or similar device, may present various challenges. For example, portions of dispensed material may fail to fully break away from the nozzle, resulting in undesirable accumulation of material at the nozzle or elsewhere. Such accumulation may negatively affect subsequent dispensing by the nozzle. As another example, a defectively dispensed volume of material may result in undesirable "satellites" (i.e., smaller volumes of material around a primary volume of material) on a substrate. Further, operating conditions and/or the particular dispensing applications themselves may vary from location to location and from testing environment to production environment. Thus, a settings profile may achieve acceptable results in a testing environment but cause numerous defects once implemented in production.

These and other shortcomings are addressed in the present disclosure.

SUMMARY

Disclosed herein are systems and methods for improved fluid dispensing process control using machine learning and/or artificial intelligence. Machine learning could include the use of any of various machine learning tools that employ machine learning algorithms, including neural networks such as Deep Neural Networks (DNN). Other examples of machine learning tools include, but are not limited to: XGBoost, Convolutional Machine Learning Tool (CNN), Support Vector Machine (SVM), Multiple Linear Regression, Random Forest, AdaBoost, Artificial Machine Learning Tool (ANN): "Conventional" Machine Learning Tool, Decision Tree (DT), Naïve Bayes, K Nearest Neighbor (KNN), Hidden Markov Model (HMM), cybernetics and brain simulation, symbolic, cognitive simulation, logic-based, anti-logic, knowledge-based, sub-symbolic, embodied intelligence, computational intelligence and soft computing, and/or the like. The machine learning may utilize feature vector processes, classification processes, grouping processes, classification processes, regression processes, analysis processes, matching processes, training processes, diagnostic processes, and/or the like.

There are various representative examples, or embodiments, of the disclosure as described below.

Images of Dispensed Volume and Parameters Input into Machine Learning Tool for Closed Loop Control In one example method, a valve of a dispensing device is opened and closed to dispense a portion of viscous fluid from a nozzle of the dispensing device according to a first value of an operating parameter of the dispensing device. One or more images of the portion of viscous fluid are captured. The one or more images of the portion of viscous fluid and the first value of the operating parameter are input to a machine learning tool to determine a classification of the portion of viscous fluid. A second value of the operating parameter is determined based on the classification of the portion of viscous fluid. A second portion of viscous fluid is dispensed according to the second value of the operating parameter.

Characteristics of Dispensed Volume from a Sensor and Parameters Input into Machine Learning Tool for Closed Loop Control In another example method, a valve of a dispensing device is opened and closed to dispense a portion of viscous fluid from a nozzle of the dispensing device according to a first value of an operating parameter of the dispensing device. A characteristic of the portion of viscous fluid dispensed from the dispensing device is determined based on data from a sensor. The characteristic of the portion of viscous fluid and the first value of the operating parameter are input to a machine learning tool to determine a classification of the portion of viscous fluid. A second value of the operating parameter is determined based on the classification of the portion of viscous fluid. A second portion of viscous fluid is dispensed according to the second value of the operating parameter.

Images of Dispensed Volume Assigned a Quality Class to Train Machine Learning Tool for Closed Loop Control In another method, a valve of a dispensing device is opened and closed to dispense a portion of viscous fluid from a nozzle of the dispensing device according to a first value of an operating parameter of the dispensing device. One or more images of the portion of viscous fluid are captured by a machine learning tool. Each of the images is assigned a quality class, in accordance with a quality classification system, to train the machine learning tool to associate quality classes with images. Depending on the quality class assigned to an image, the trained machine learning tool may control the system to dispense a second portion of viscous fluid according to a second value of the operating parameter.

Images of Dispensed Volume Assigned a Quality Class, and Operating Parameters Producing the Dispensed Volume are Recorded, to Train Machine Learning Tool for Closed Loop Control In yet another example, a valve of a dispensing device is opened and closed to dispense a portion of viscous fluid from a nozzle of the dispensing device according to a first value of an operating parameter of the dispensing device. One or more images of the portion of viscous fluid are captured by a machine learning tool. Each of the images is assigned a quality class, in accordance with a quality classification system, to train the machine learning tool to associate quality classes with images. The first value of an operating parameter is also used to train the machine learning tool to associate a quality class with the parameter.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

BRIEF DESCRIPTION OF DRAWINGS

The accompanying drawings, which are incorporated in and constitute a part of this specification, illustrate embodiments and together with the description, serve to explain the principles of the methods and systems.

Aspects of the disclosure will now be described in detail with reference to the drawings, wherein like reference numbers refer to like elements throughout, unless specified otherwise.

DETAILED DESCRIPTION

The systems and methods of the present disclosure relate to improved fluid dispensing process control using machine learning tools. In an example, a dispensing system may comprise a dispensing device configured to dispense volumes of fluid, such as a viscous fluid. A viscous fluid may comprise an adhesive, for example. According to one method of the disclosure, a machine learning tool may be configured to determine a classification (e.g., a no-defect classification or various types of defect classifications) of a dispensed fluid volume based on an input of one or more in-flight images of the fluid volume and a first value of an operating parameter (e.g., valve needle velocity or stroke length) used to dispense the fluid volume. A classification may comprise an on-substrate classification. An on-substrate classification may be a classification of the dispensed fluid on the substrate. For example, the classification could cover a defect that the dispensed fluid is not in its correct location on the substrate (misplacement defect). Another example is a satellite defect. A satellite defect may be a defect wherein small parts of the dispensed fluid volume break off to form a splatter of small deposits outside of the target dispense area on the substrate. An example of a classification that is not an on-substrate classification is an accumulation defect. An accumulation defect is a defect wherein there is an accumulation of dispense material on the nozzle of the dispense valve nozzle. Based on the classification of the fluid volume as comprising one of these defects, for example, a second value of the operating parameter may be determined. Another fluid volume may be subsequently (although not necessarily immediately subsequent) dispensed according to the second value of the operating parameter.

A closed-loop process control may be implemented over multiple similar iterations of the above steps. A machine learning tool typically outputs a probability for each of one or more candidate classifications (e.g. 90% probability that satellite defect class applies and 10% probability that accumulation defect class applies). A trend in the probabilities may be identified to determine a predicted time when a defect will need to be remedied.

One or more images of an in-flight sample fluid volume may comprise inputs to an in-training machine learning tool. In this example, an "in-training machine learning tool" is a machine learning tool that is being trained to associate in-flight images with defect classifications.

Figure 1A:
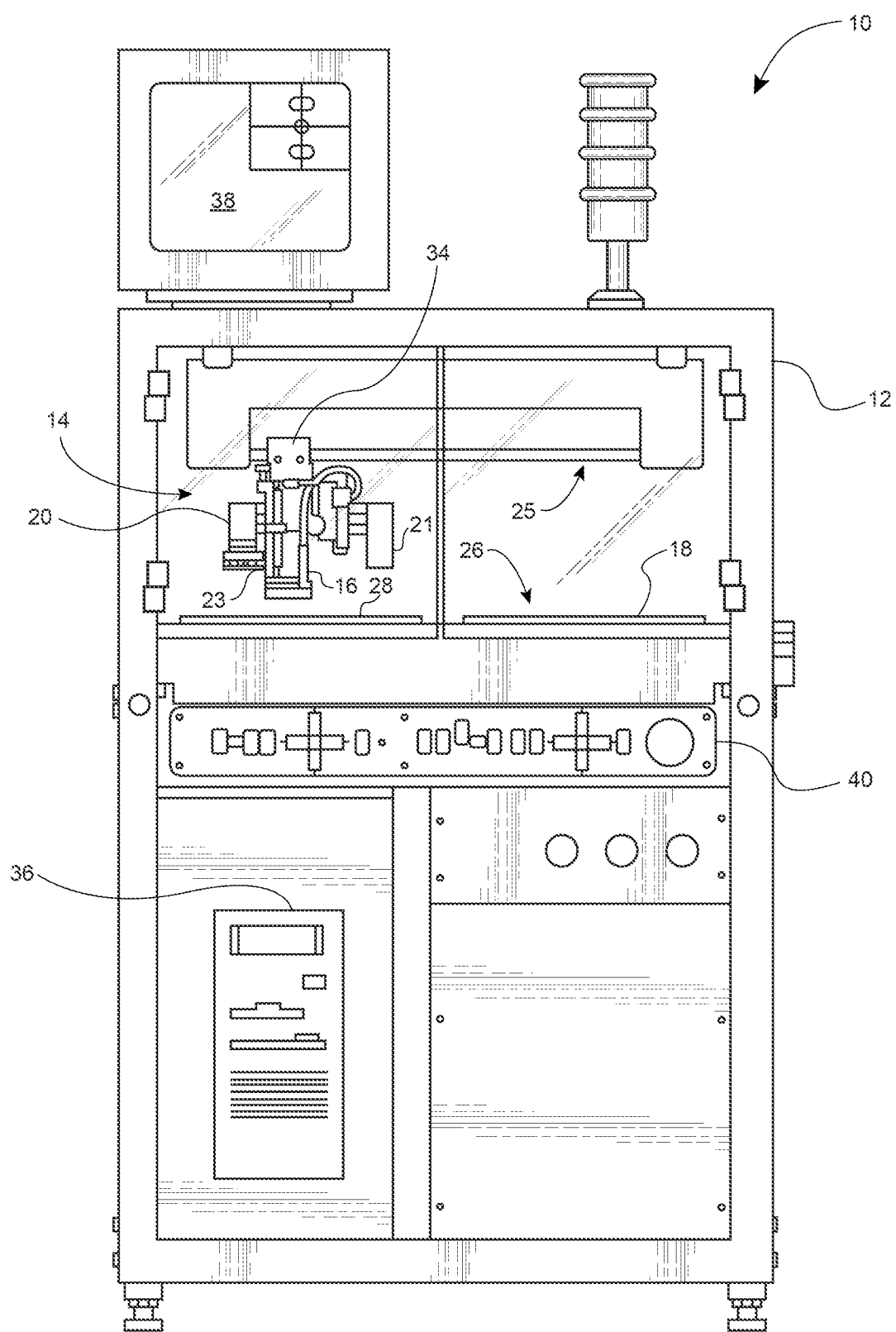
FIG. 1A illustrates an example dispensing system according to an embodiment of the present disclosure.

FIG. 1A illustrates an example dispensing system 10 that may include a cabinet 12 and a dispensing assembly 14. The dispensing assembly 14 may include a dispensing nozzle 16 having a valve for selectively dispensing controlled amounts of fluid or viscous material onto a substrate 18 (e.g., a circuit board or other customer product) positioned on a production area 26 of the cabinet 12. The dispensing nozzle 16 may perform a dispensing operation (i.e., opening and closing the valve of the dispensing assembly 14) while the dispensing assembly 14 is stationary, including dispensing a continuous stream and/or a discontinuous series of fluid volumes. Additionally or alternatively, the dispensing nozzle 16 may perform a dispensing operation (i.e., opening and closing the valve of the dispensing assembly 14) while the dispensing assembly 14 is moving, including dispensing a continuous stream and/or a discontinuous series of fluid volumes.

The dispensing assembly 14 may also include a camera 20 and a height sensor 21. The camera 20 may be implemented as a lookup camera, a look down camera, a high-speed camera, and/or the like. The dispensing nozzle 16 may be a needle dispenser, a spray dispenser, a jetting dispenser, and/or any other device suitable for dispensing fluid or viscous materials such as adhesives, epoxies, solder pastes, and/or the like onto the substrate 18 from a fluid material reservoir 23. The dispensing assembly 14 may be coupled to a positioner 25 configured to selectively position the dispensing assembly 14 above the production area 26 and a service station 28 (i.e., a service area) of the cabinet 12. The positioner 25 may be a three-axis positioner that includes independently controllable x-axis and y-axis drives configured to move the dispensing assembly 14 in a horizontal plane above the production area 26 and/or the service station 28, and adjust the height of the dispensing assembly 14 and/or dispensing nozzle 16 relative to the surface of the production area 26 and/or the service station 28. The positioner 25 may thereby provide three substantially perpendicular axes of motion for the dispensing assembly 14. Although the dispensing assembly 14 is shown in the illustrated embodiment as being coupled to an x-y positioner by a z-axis drive 34, persons having ordinary skill in the art will understand that other mechanisms could be used to position the dispensing assembly 14.

The dispensing system 10 may also include a controller 36, which may be mounted in the cabinet 12 or may be remote. The controller 36 may be configured to provide overall control of the dispensing system 10, such as coordinating movements of the dispensing assembly 14, actuating the dispensing nozzle 16, and/or actuating components of the service station 28. The controller 36 may include a processor, a memory, and an input/output (I/O) interface. The processor may include one or more devices selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog or digital) based on operational instructions that are stored in the memory. The memory may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing digital information. The memory may also include a mass storage device (not shown) such as a hard drive, optical drive, tape drive, non-volatile solid state device and/or any other device capable of storing digital information. The processor may operate under the control of an operating system that resides in memory.

A user interface 38 and/or a control panel 40 may be communicatively connected to the controller 36 to allow a system operator to interact with the controller 36. The user interface 38 may include a video monitor, alphanumeric displays, a touch screen, a speaker, and/or any other suitable audio and/or visual indicators capable of providing information to the system operator. The control panel 40 may include one or more input devices capable of accepting commands and/or input from the operator, such as an alphanumeric keyboard, a pointing device, keypads, push-buttons, control knobs, microphones, touchscreens, and/or the like. In this way, the user interface 38 and/or the control panel 40 may enable manual initiation and/or control of system functions, for example, during set-up, calibration, inspection, cleaning, operation, and/or the like.

Figure 1B:
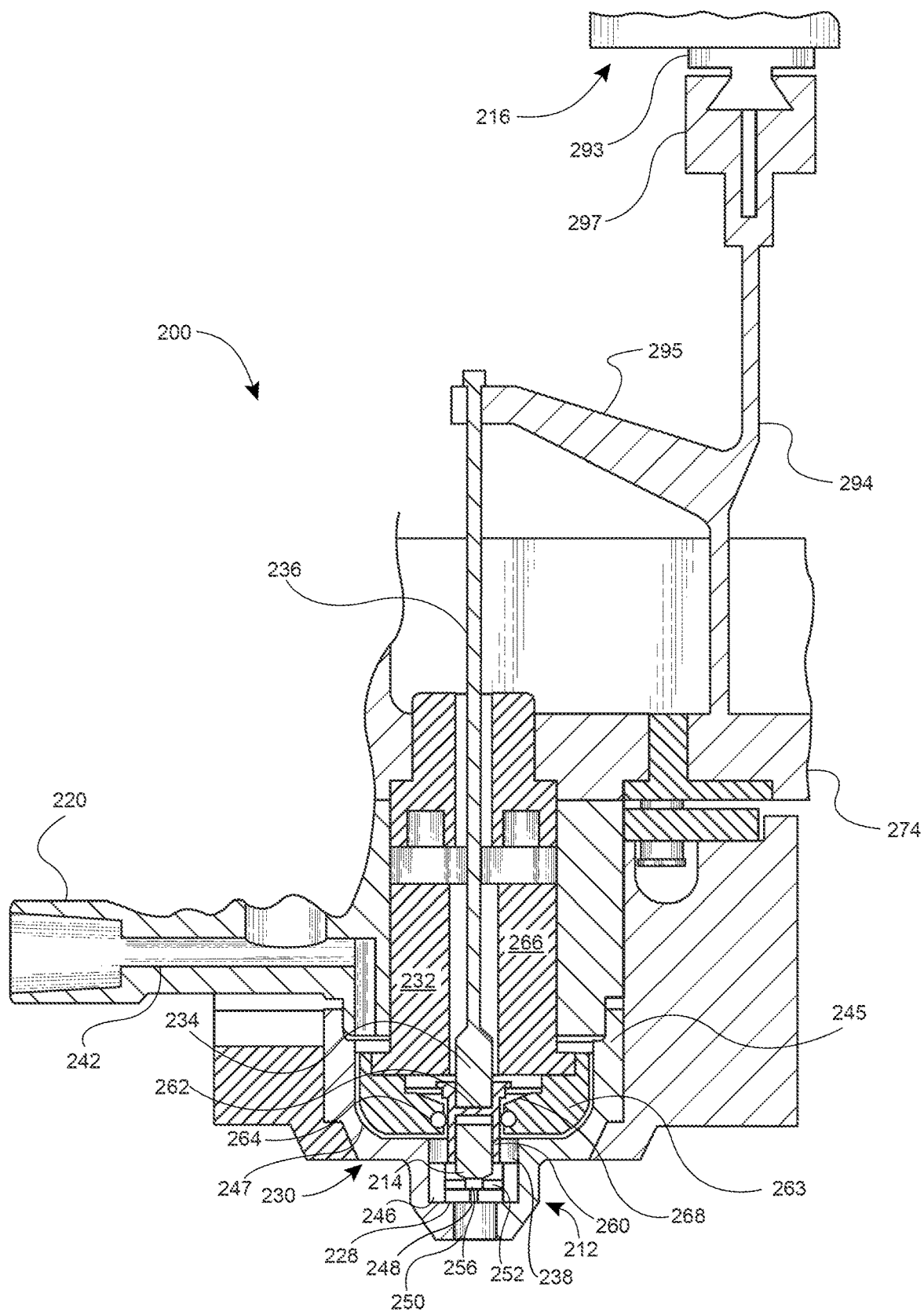
FIG. 1B illustrates a cross-sectional view of an example dispensing assembly usable with the dispensing system of FIG. 1A and according to an embodiment of the present disclosure.

FIG. 1B illustrates an example dispensing assembly 200, which may realize the dispensing assembly 14 of FIG. 1A. The dispensing assembly 200 may include a fluid module 212 having a fluid connection interface 220, a valve element 214, a piezoelectric drive module 216, a movable needle or drive pin 236 coupled with the piezoelectric drive module 216, and an outer cover (not shown) housing the piezoelectric drive module 216. However, the piezoelectric drive module 216 may be implemented using other types of drive technology. The dispensing assembly 200 may operate as a jetting dispenser that intermittently jets volumes of a fluid material onto a substrate and may be moved relative to the substrate as the volumes of fluid material are jetted. The dispensing assembly 200 may be operated such that a succession of jetted volumes of the fluid material may be deposited on the substrate as a line of spaced-apart material dots. The substrate targeted by the dispensing assembly 200 may support various surface mounted electronic components, which necessitates non-contact jetting of the minute volumes of fluid material rapidly and with accurate placement to deposit fluid material at targeted locations on the substrate.

The fluid module 212 may include a nozzle 228, a fluid module body 230, a fluid chamber 238, and/or the like in communication with the fluid connection interface 220. A first section or portion of the fluid module body 230 may include a fluid inlet 242 and a passageway 247 that couples the fluid inlet 242 in fluid communication with the fluid chamber 238. A fluid conduit (not shown) may extend from the fluid source (e.g., a pressurized fluid source) to the fluid inlet 242 for placing the fluid module 212 in fluid communication with the fluid material contained inside the fluid source and for supplying the fluid material under pressure from the fluid source to the fluid connection interface 220. In this embodiment, the fluid conduit is typically a length of tubing directly connecting the outlet of the fluid source with the fluid connection interface 220 without any intervening structure. In one embodiment, the fluid connection interface 220 includes a Luer fitting.

A second portion 245 of the fluid module body 230 may be configured to support the nozzle 228. A centering piece 246 may align a fluid outlet 248 in the nozzle 228 with a passageway 250 extending through the second portion 245 of the fluid module body 230. A valve seat 252 is disposed between the fluid inlet 242 and the fluid outlet 248. The valve seat 252 may have an opening 256 in fluid communication with the fluid outlet 248. The centering piece 246 maintains the fluid outlet 248 in the nozzle 228, the passageway 250 in the second portion 245 of the fluid module body 230, and the opening 256 in the valve seat 252 in a concentric alignment.

The dispensing assembly 200 may further include a strike plate in the form of a wall 262 of a movable element 260. A biasing element 268, which peripherally contacts the movable element 260, may be configured to apply an axial spring force to the movable element 260.

A sealing ring 264 may be utilized to implement a sealing engagement between an insert 263 and the exterior of the movable element 260. The part of the movable element 260 which is below the sealing ring, or O-ring, 264 defines a part of the boundary of the fluid chamber 238. The movable element 260 may include the valve element 214. The valve element 214 is located inside the fluid chamber 238 at a location between the wall 262 of the movable element 260 and the valve seat 252.

The drive pin 236 may project through a bore 266 in a third portion 232 of the fluid module body 230. The tip 234 of the drive pin 236 may be located adjacent to the wall 262 of the movable element 260 and on an opposite side of the wall 262 from the valve element 214. While the valve element 214 is exposed to the fluid material contained inside the fluid chamber 238, the bore 266 containing the drive pin 236 may be isolated from the fluid material in fluid chamber 238 so that the drive pin 236 is not wetted by the fluid material. As a result, the construction of the modular jetting device 210 can omit the conventional fluid seals that permit powered motion of the drive pin 236 while isolating the driving or actuation mechanism (e.g., the piezoelectric drive module 216) for the drive pin 236 from the fluid material in the fluid chamber 238.

The drive pin 236 may be indirectly coupled with the valve element 214 and may operate as a component of the piezoelectric drive module 216 or other drive module. The drive pin 236 and valve element 214 may jointly cooperate to dispense fluid material by jetting from the modular jetting device 210. When the drive pin 236 is moved to cause the valve element 214 to contact the valve seat 252, the tip 234 of the drive pin 236 may operate much like the operation of a hammer by striking the wall 262 of the movable element 260 to transfer its force and momentum to the wall 262, which in turn causes the valve element 214 to rapidly strike the valve seat 252 and jet a droplet, stream, and/or discontiguous volume of material from the jetting device. Specifically, the valve element 214, which is not directly connected with the drive pin 236, may be configured to be moved into contact with the valve seat 252 by an impulse imparted by the tip 234 of the actuated drive pin 236 to the wall 262 of the movable element 260. As a result, the drive pin 236 is actuated and a volume of fluid material is jetted from the fluid chamber 238 without any portion of the drive pin 236, including but not limited to the tip 234, being wetted by the jetted fluid material. When contact between the drive pin 236 and wall 262 is removed, the axial spring force applied by the biasing element 268 acts to move the valve element 214 and movable element 260 away from the valve seat 252 in a direction aligned with the longitudinal axis of the drive pin 236. Each reciprocating cycle of the drive pin 236 and valve element 214 jets a droplet, stream, or discontiguous volume of the fluid material. The cycle is repeated to jet sequential droplets of fluid material as required.

The surface of the valve element 214 facing the valve seat 252 may have a curvature to match the shape of the surface of the valve seat 252 encircling an opening 254. As a result of the shape matching, a fluid seal is temporarily formed when the valve element 214 has a contacting relationship with valve seat 252 during jetting. Establishment of the fluid seal during motion of the valve element 214 halts the flow of fluid material from the fluid chamber 238 past the valve seat 252.

Figure 1C:
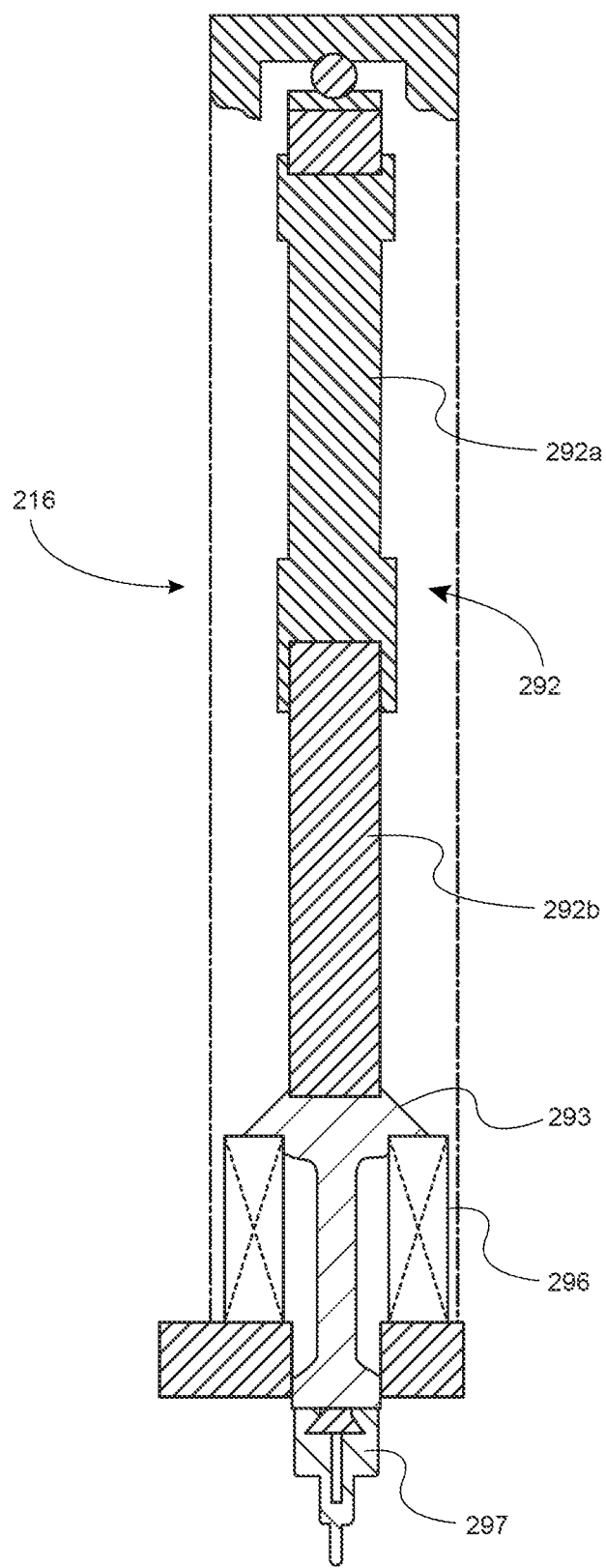
FIG. 1C illustrates a cross-sectional view of a piezoelectric drive module of the dispensing system of FIG. 1B according to an embodiment of the present disclosure.

FIG. 1C illustrates a detailed view of the piezoelectric drive module 216. The piezoelectric drive module 216 may be used to actuate the valve element 214 of the fluid module 212. The piezoelectric drive module 216 may operate according to control signals from a controller (e.g., the controller 36 of FIG. 1A). In the present embodiment, the piezoelectric drive module 216 includes piezoelectric stacks 292a and 292b (a piezoelectric stack 292, collectively), a plunger 293, and an asymmetrical flexure 294. The asymmetrical flexure 294 may be an integral part of actuator body 274 and may include a coupling element 297 that connects the asymmetrical flexure 294 to the plunger 293. A spring 296 may be implemented to apply a spring force to the plunger 293 and the piezoelectric stacks 292a, 292b to keep them in compression.

The plunger 293 may function as a mechanical interface connecting the piezoelectric stack 292 with the asymmetrical flexure 294. The spring 296 may be compressed in the assembly such that the spring force generated by the spring 296 applies a constant load on piezoelectric stack 292, which preloads the piezoelectric stack 292. The asymmetrical flexure 294, which may be comprised of a metal, has an arm 295 that is physically secured with an end of the drive pin 236 opposite to the tip 234 of drive pin 236. The asymmetrical flexure 294 functions as a mechanical amplifier that may convert the relatively small displacement of the piezoelectric stack 292 into a useful displacement for the drive pin 236 that is significantly larger than the displacement of the piezoelectric stack 292.

The piezoelectric stack 292 of the piezoelectric drive module 216 may be a laminate comprised of layers of a piezoelectric ceramic that alternate with layers of a conductor as is conventional in the art. The spring force from the spring 296 maintains the laminated layers of the piezoelectric stack 292 in a steady state of compression. The conductors in the piezoelectric stack 292 are electrically coupled with a driver circuit, which supplies current-limited output signals, in a manner well known in the art, with pulse width modulation, frequency modulation, or a combination thereof. When power is periodically supplied from the driver circuit 298, electric fields are established that change the dimensions of the piezoelectric ceramic layers in the piezoelectric stack 292.

The dimensional changes experienced by the piezoelectric stack 292, which are mechanically amplified by the asymmetrical flexure 294, move the drive pin 236 linearly in a direction parallel to its longitudinal axis. When the piezoelectric ceramic layers of the piezoelectric stack 292 expand, the spring 296 is compressed by the force of the expansion and the asymmetrical flexure 294 pivots about a fixed pivot axis to cause movement of the tip 234 of the drive pin 236 upward and away from the wall 262 of the movable element 260. This allows the biasing element 268 to move the valve element 214 away from the valve seat 252. When the actuation force is removed and the piezoelectric ceramic layers of the piezoelectric stack 292 are permitted to contract, the spring 296 expands and the asymmetrical flexure 294 pivots to move the drive pin 236 downward so that the tip 234 moves into contact with the wall 262, causing the valve element 214 to contact the valve seat 252 and jet a droplet, stream, and/or discontiguous volume of material. Thus, in the de-energized state, the piezoelectric drive module 216 maintains the valve in a normally closed position. In normal operation, the asymmetrical flexure 294 intermittently rocks in opposite directions about a fixed pivot axis as the piezoelectric stacks 292*a,* 292*b* are energized and de-energized to move the tip 234 of drive pin 236 into and out of contact with the wall 262 of the movable element 260 to jet droplets of material at a rapid rate.

Figure 2:
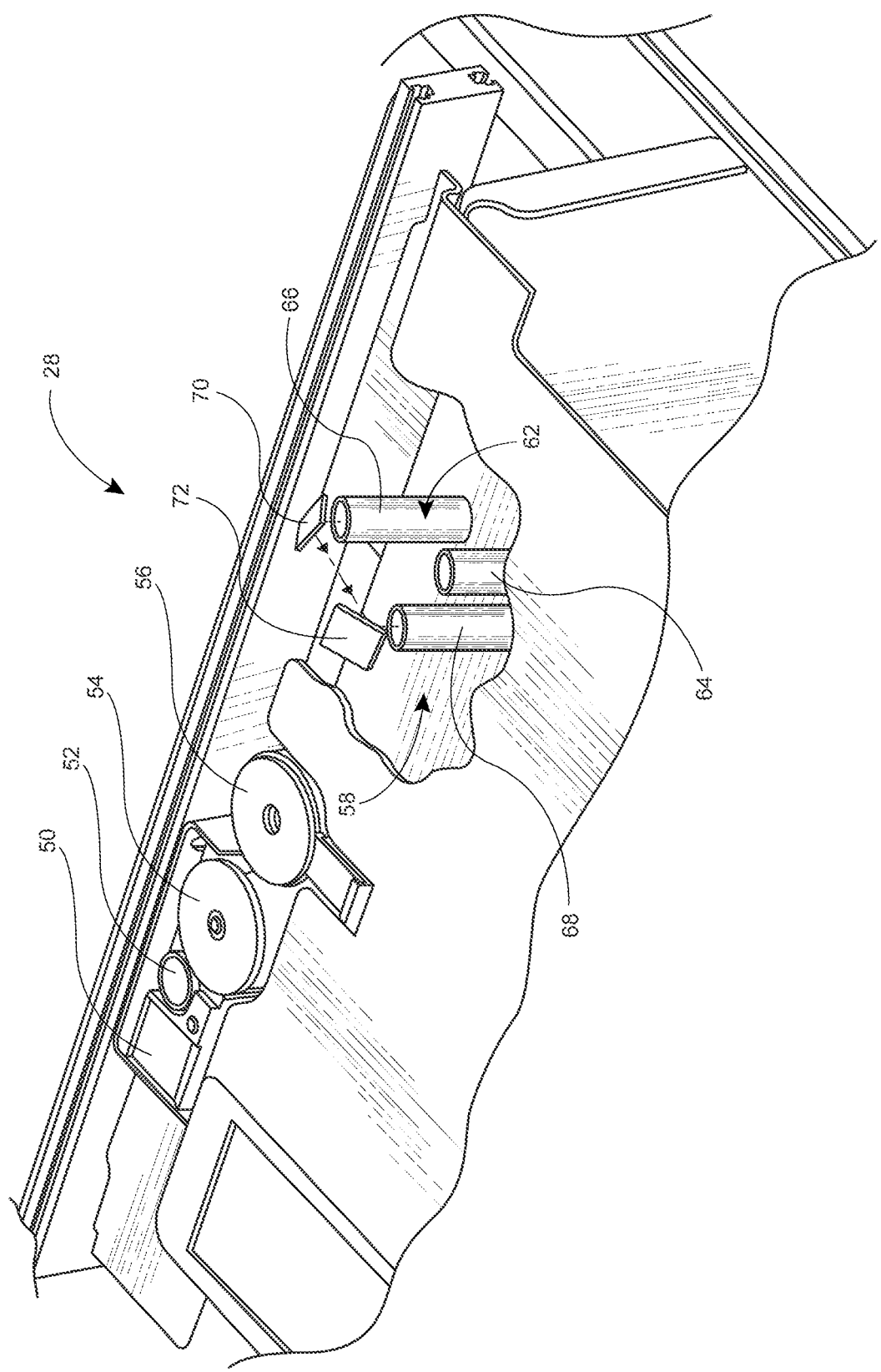
FIG. 2 illustrates an example dispensing calibration station according to an embodiment of the present disclosure.

FIG. 2 illustrates an example service station 28 configured, among other functions, to capture one or more images of a volume of fluid dispensed from the dispensing nozzle 16 (not shown—see FIG. 1A) and/or measure a characteristic of a volume of fluid dispensed from the dispensing nozzle 16. As shown, the service station 28 may include a platform supporting one or more of a position calibration station 50, a touch sensor station 52, a purge station, a weighing station, a dispensing calibration station 58, and/or the like.

The position calibration station 50 may be configured to calibrate the x/y-position of the dispensing nozzle 16. For example, the position calibration station 50 may provide a fixed reference point that can be captured by the camera 20 and/or the height sensor 21, which generates a signal to the controller 36. The controller 36 may then calibrate the x/y-position of the camera and/or the height sensor 21 based on the signal.

The touch sensor station 52 may be configured to calibrate the z-position of the dispensing nozzle 16. For example, the dispensing nozzle 16 may be lowered toward the touch sensor station 52 until contact is initially sensed by a pressure sensitive region of the touch sensor station 52. Based on the initial contact by the dispensing nozzle 16, a signal is generated by the touch sensor station 52 and transmitted to the controller 36. The controller 36 may then calibrate the z-position of the dispensing nozzle 16.

The purge station 54 may be configured to remove waste material from the dispensing nozzle 16. For example, the purge station 54 may include a source of vacuum configured to generate negative pressure to suck the fluid or viscous material and/or cleaning material from a surface of the dispensing nozzle. The vacuumed material may be deposited in a reservoir (not shown) positioned underneath the platform 48.

The weighing station 56 may be configured to calibrate the material of the dispensing system 10. For example, the weighing station 56 may include a scale, a load cell, a force transducer, a strain gauge, and/or the like configured to receive and weigh one or more droplets from the dispenser. The scale may then generate a signal indicative of the weight, which is transmitted to the controller 36. Based on the weight of the material, the controller 36 may calibrate the material deposited by the dispensing nozzle 16.

The dispensing calibration station 58 may be configured to capture one or more images of an amount of fluid as the amount of fluid is dispensed from the dispensing nozzle 16. The amount of fluid may be identified as, or referred to as, a volume of fluid, a size of fluid, a weight of fluid, a shape of fluid, and/or other physical characteristics of the fluid being dispensed. Throughout this application, the amount of fluid may be referred to as a volume of fluid, but it should be understood that the amount of fluid can be identified by a different physical attribute, such as any listed above, and that the referenced volume of fluid is a description of the amount of fluid and does not necessarily impart a discrete quantity of volume to the reference. Additionally or alternatively, the dispensing calibration station 58 may be configured to measure one or more characteristics of the amount of fluid as the amount of fluid is dispensed from the dispensing nozzle 16, such as velocity, width, diameter, length, shape, or directionality. As such, the dispensing calibration station 58 may include an imaging assembly 62 and a receptacle 64 for catching and retaining sample amounts of fluid. The imaging assembly 62 may capture one or more images of the fluid amount while the fluid amount is in flight between the dispensing nozzle 16 and the receptacle 64. In some aspects, the imaging assembly 62 may capture one or more images of the fluid amount while the fluid amount is still in contact with the dispensing nozzle 16. In some aspects, the imaging assembly 62 may capture one or more images of the fluid amount after it has been deposited onto a suitable substrate. Images and/or other characteristics measured by the dispensing calibration station 58 may be transmitted to the controller 36 for further processing, such as being input to a machine learning tool to adjust one or more operating parameters of the dispensing system 10, including the dispensing assembly 14.

In the embodiment illustrated in FIG. 2, the imaging assembly 62 includes a light source 66 and a light sensor assembly 68 in opposing alignment with the light source 66. The light sensor assembly 68 may comprise a camera, for example. The camera may include one or more lenses, a shutter, a charge-coupled device (CCD), and/or the like. The light source 66 may intermittently strobe or project a beam of light across the flight path of the dispensed fluid volume. The light source 66 may be positioned such that the beams of light are normal to the flight path of the dispensed fluid volume. The light sensor assembly 68 may be positioned relative to the light source 66 to capture an image or other representation of the fluid volume as it passes through a beam of light from the light source 66. Although the imaging assembly 62 of the present embodiment is described in terms of a light source and light sensor assembly pairing, the imaging assembly 62 is not so limited and other types of apparatus may be used to measure or determine a characteristic of the fluid volume. Nor must the fluid volume characteristic be measured or determined using an imaging apparatus or technique per se.

In other embodiments, the imaging assembly 62 may include multiple pairings of light sources 66 and light sensor assemblies 68. For example, the imaging assembly 62 may include a first pairing and a second pairing in an arrangement in which the light beam of the first pairing is normal to the light beam of the second pairing.

The imaging assembly 62 may further include one or more angled mirrors, which may allow design flexibility in the arrangement of the imaging assembly 62 and the receptacle 64 within the service station 28. The light source 66, the light sensor assembly 68, or both may be positioned vertically within the service station 28 by virtue of one or more mirrors redirecting the light beam from the light source 66. For example, the imaging assembly 62 may include a first mirror 70 associated with the light source 66 and a second mirror 72 associated with the light sensor assembly 68. The first mirror 70 may be positioned relative to the light source 66 so that the light beam from the light source 66 is reflected through a travel path of a dispensed fluid volume. The second mirror 72 may be positioned to reflect the beam of light to the light sensor assembly 68.

In operation, with respect to the dispensing calibration station 58, the dispensing system 10 may selectively operate in a production mode or a service mode. In the production mode, the dispensing assembly 14 may be positioned over the production area 26 and proximate (e.g., directly above) a substrate 18. In this position, the dispensing assembly 14 may dispense fluid onto the surface of the substrate 18. The dispensing assembly 14 may further dispense fluid onto the surface of successive substrates 18.

In the service mode, the dispensing operations of the production mode are suspended and the dispensing assembly 14 is positioned proximate the service station 28 and the dispensing calibration station 58 in particular. The service mode may be initiated at pre-set intervals or in response to a manual operator input, for example. In the service mode, a closed loop dispensing process control, or portions thereof, may be performed. After the closed loop dispensing process control, or portions thereof, is complete, the dispensing system 10 may re-enter the production mode and position the dispensing assembly 14 over a substrate 18 to process said substrate 18. Additionally or alternatively, the closed loop dispensing process control, or portions thereof, may be performed while in production mode. Thus, the dispensing calibration station 58 or portions thereof, such as the imaging assembly 62, may be positioned in the production area 26 so as to capture images of the volumes of fluid (or otherwise measure various characteristics of the volumes of fluid) as they are dispensed on the substrates 18. In some aspects, the dispensing calibration station 58 or portions thereof can additionally or alternatively capture images of the volumes of fluid after they have been dispensed onto the substrates 18.

Figure 3:
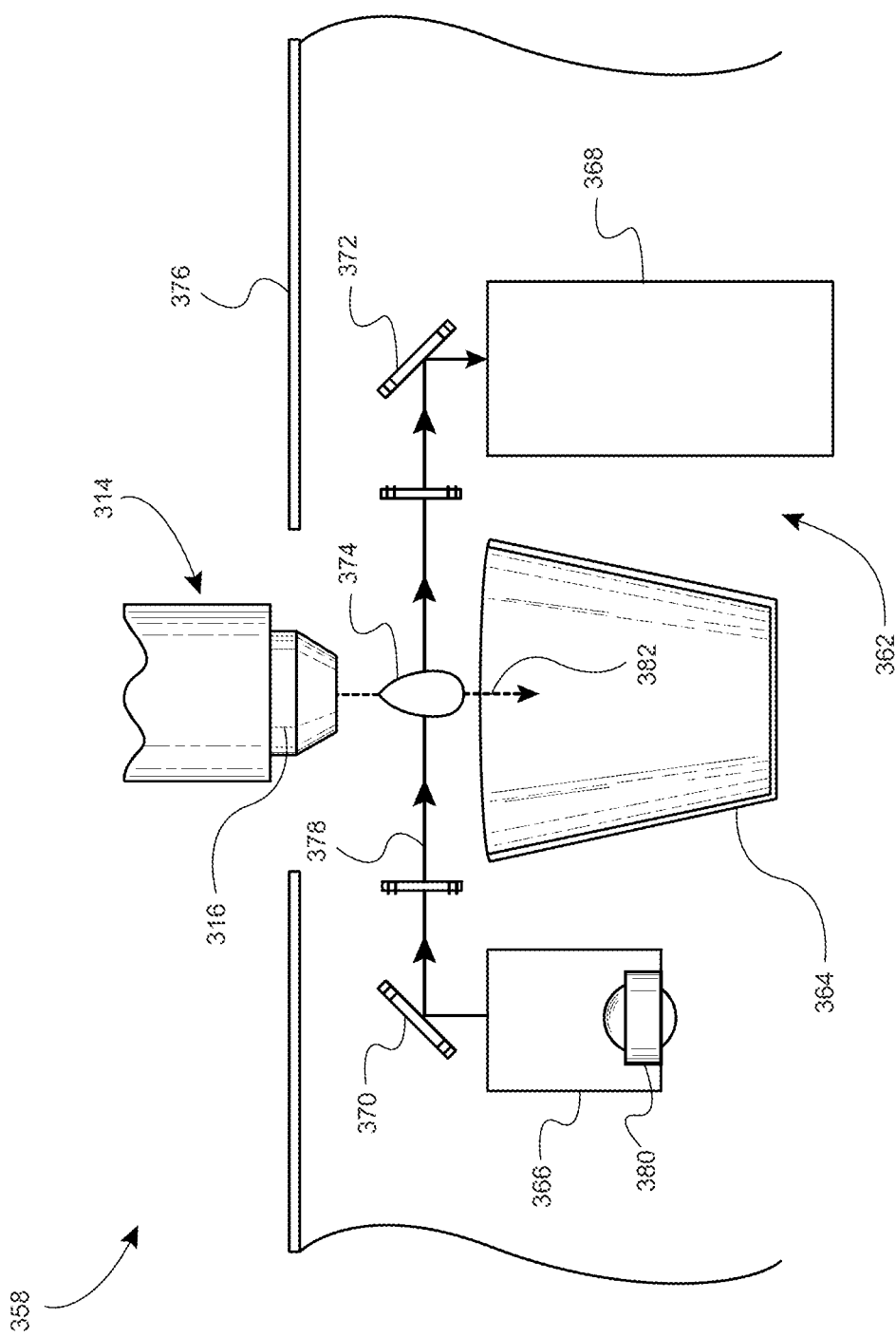
FIG. 3 illustrates an example dispensing calibration station according to an embodiment of the present disclosure.

FIG. 3 illustrates a side view of at least a portion of an example dispensing calibration station 358 along with a dispensing assembly 314 with a dispensing nozzle 316. The dispensing calibration station 358 includes an imaging assembly 362 and a corresponding receptacle 364. The dispensing calibration station 358 may include a surface 376. The dispensing calibration station 358, the imaging assembly 362, the receptacle 364, the dispensing assembly 314, and the dispensing nozzle 316 may be similar in some aspects with, respectively, the dispensing calibration station 58, the imaging assembly 62, the receptacle 64, the dispensing assembly 14, and the dispensing nozzle 16 of FIGS. 1A and 2.

The dispensing calibration station 358 may include the imaging assembly 362 which comprises a light source 366 and a light sensor assembly 368. The light sensor assembly 368 may comprise a camera. A light emitting diode (LED) 380 may generate the light beam 378, which is projected by the light source 366. The light sensor assembly 368 and the light source 366 may be arranged in opposing alignment of a flight path of a fluid volume 374 dispensed from the dispensing nozzle 316 of the dispensing assembly 314. A first angled mirror 370 reflects the light beam 378 from the light source 366 in a horizontal direction. A second angled mirror 372 reflects the horizontal light beam 378 in a vertical direction to the light sensor assembly 368 after the light beam 378 passes, at least in part, through the fluid volume 374.

The light sensor assembly 368 may capture one or more images of the fluid volume 374 as it is dispensed. In some aspects, the light sensor assembly 368 may capture a composite image comprising more than one representation of the fluid volume 374 using for example image stitching. The light beam 378 may comprise an intermittent series or strobes of light from the light source 366. An intermittent or strobed light beam may allow the light sensor assembly 368 to capture the multiple representations of the fluid volume 374 as it passes through the light beam 378. Such multiple representations of the fluid volume 374 may facilitate determining, for example, a directionality of the fluid volume 374 or a velocity of the fluid volume 374. In some aspects, the light beam 378 may represent a continuous projection of light from the light source 366. In this case, a high-speed video capture system may find use to capture imagery of the fluid volume 374 as it passes through the continuous light stream.

Although the dispensing calibration station 358 is depicted with the light source 366 and the light sensor assembly 368 in vertical orientation, it is contemplated that one or more of the light source 366 and the light sensor assembly 368 may be orientated horizontally. This horizontal orientation of the light source 366 and/or the light sensor assembly 368 may obviate the need for one or more of the first and second mirrors 370, 372.

Figure 4:
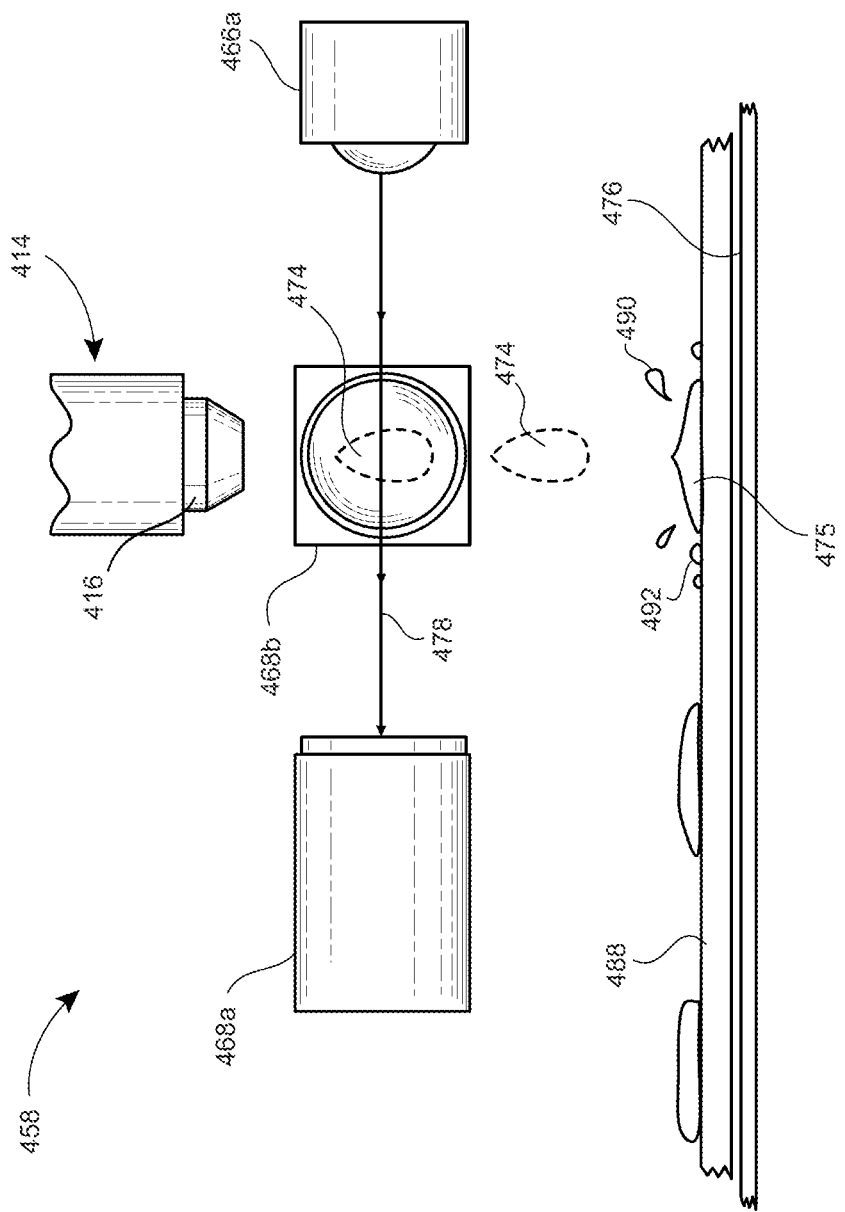
FIG. 4 illustrates an example dispensing calibration station according to an embodiment of the present disclosure.

FIG. 4 illustrates a side view of an example dispensing calibration station 458 according to an embodiment. The dispensing calibration station 458 may be configured with two light sensor assembly/light source pairs in a perpendicular arrangement, rather than the single light sensor assembly/light source configuration shown in FIGS. 2 and 3. Further, the dispensing calibration station 458 is implemented to capture images of dispensed fluid volumes as they are being dispensed onto a substrate, rather than the receptacle shown in FIGS. 2 and 3. As such, the dispensing calibration station 458 includes a dispensing assembly 414 with a dispensing nozzle 416 configured to apply a volume of fluid 474 to a substrate 488. The volume of fluid 474 that is applied to the substrate 488 may be referred to as a fluid deposit 475. The in-flight fluid volume 474 is shown over several progressive instances in ghost representation.

A first light sensor assembly 468a (e.g., a camera) may capture an image of the fluid volume 474 via a light beam 478 from an opposite first light source 466a. An image of the in-flight fluid volume 474 may be additionally or alternatively captured by a second light sensor assembly 468b in conjunction with a second light source (not shown). The first light sensor assembly 468a/first light source 466a pair and the second light sensor assembly 468b/second light source pair may be positioned in a perpendicular relationship to one another. The images captured by the first light sensor assembly 468a and the second light sensor assembly 468b may be both associated with a particular volume of fluid 474 and may be both independently provided to the controller for processing. Additionally or alternatively, the images captured by the first and second light sensor assemblies 468a,b may form a composite image or other representation of the fluid volume 474 and used by the controller for processing. For example, a three-dimensional model may be generated.

In one aspect, the dispensing calibration station 458 may be implemented for use in a service mode. For example, the dispensing calibration station 458 may be implemented in the service station 28 of FIGS. 1A and 2. As such, the substrate 488 may comprise a sample substrate, positioned on the surface 476 of the dispensing calibration station 458, to receive the fluid volumes 474. The substrate 488 may be of a similar type (e.g., printed circuit board) as that found in the production area 26 and/or in production mode. The substrate 488 may be configured to move in a manner similar to that of a conveyer belt, although not necessarily in continuous motion. The substrate 488 may be made of a flexible material, such as a paper product or a flexible plastic, and fed from a roll feed of the sample substrate.

In another aspect, the dispensing calibration station 458 may be implemented for use in a production mode. For example, the dispensing calibration station 458 may be implemented in the production area 26 of FIG. 1A. Thus, the substrate 488 may comprise a production substrate. Such substrate may be placed at the production area by an operator or an automated mechanism, such as a robotic arm. Additionally or alternatively, the production substrate may be one or a series of substrates conveyed beneath the dispensing nozzle 416 to each receive one or more volumes of fluid 474. The dispensing calibration station 458 may capture images for each of the volumes of fluid or may capture images of a subset of the volumes of fluid (e.g., at pre-determined intervals).

Further illustrated in FIG. 4 is an example of one or more "satellites" 492 of a fluid deposit 475 on the substrate 488. The satellites may be the result of small aerial droplets 490 that are formed due to the impact of the in-flight fluid volume 474 upon the substrate 488. Although not strictly contiguous with the fluid deposit 475, the aerial droplets 490 and the satellites 492 may be considered as part of the fluid deposit 475 unless context clearly dictates otherwise.

Training of the Machine Learning Tool

Figure 5:
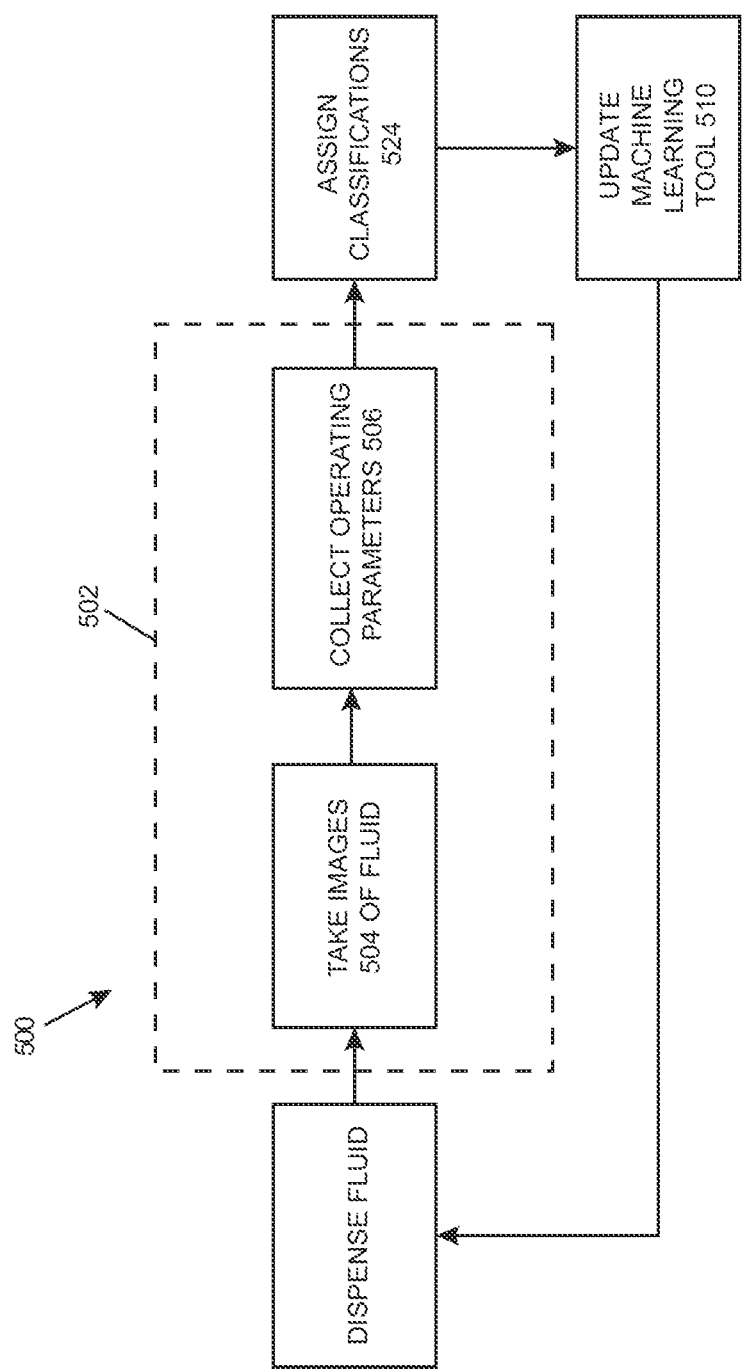
FIG. 5 illustrates an example flow diagram for one method for training a machine learning tool according to an embodiment of the present disclosure.

FIG. 5 illustrates a flow diagram 500 that may be used to train a machine learning tool 510 that is configured to determine a classification (defect or otherwise) of a dispensed amount of fluid, for example a volume of fluid dispensed by a dispensing device (e.g., the dispensing assembly 14 with dispensing nozzle 16 of FIG. 1A). Dispensing data 502 can be collected in response to, prior to, or at the same time as the fluid is dispensed. The dispensing data 502 may include fluid images 504 and/or one or more operating parameters 506. As shown in FIG. 5, a volume of fluid is dispensed, and fluid volume images 504 are collected. In a preferred embodiment, the images are in-flight images of the dispensed volume as it travels from the dispensing device nozzle to the substrate (as shown in FIGS. 9A-10C, for example). The operating parameters 506 associated with dispensing the volume may also be collected. The operating parameters 506 will be discussed in detail below. After a volume of fluid is dispensed and lands on the substrate, an operator looks at the result of dispensing the volume, or a group of volumes dispensed, with those conditions by observing satellites as a part of the dispensed volume on the substrate, or accumulation on the nozzle, and assigns a classification 524 to the dispensed volume. The dispensing data 502, comprised of the images 504 and parameters 506 associated with the dispensed volume(s), and the classification 524 assigned to the dispensed volume(s), are then input into the machine learning tool 510 to train the machine learning tool to associate that defect classification 524 with the images 504 and parameters 506. Another volume is then dispensed and the training cycle is repeated. The cycle is continually repeated until the machine learning tool 510 has been trained to associate various types of images 504, and parameters 506 which were used to dispense the volumes associated with the images, with the defect classifications 524 that are indicated by the images 504.

Every training cycle further trains, or updates, the machine learning tool 510. Thus, a further update to the machine learning tool 510 may be based on the input of additional in-flight images 504 of additional dispensed fluid volumes and the operating parameters 506 under which those fluid volumes were dispensed, as well as the corresponding classifications 524 of the dispensed volumes that have been determined by an operator. It should be understood, however, that although the process above describes training the machine learning tool 510 utilizing in-flight images of the dispensed fluid, a similar process 500 may be implemented that utilizes images of the dispensed fluid at different stages of the dispensing process, such as when the fluid is in-flight and is still attached to the dispensing nozzle, when the fluid is in-flight and is separated from the dispensing nozzle and is between the dispensing nozzle and the substrate, when the fluid is in contact with the substrate, or another stage of dispensing.

In-Flight Images of Dispensed Volumes

The images 504 and parameters 506 may include the dispensing data 502 as noted. The images 504 are preferably in-flight fluid volume images 504 as noted above. The fluid volume images 504 may have been captured by the light sensor assembly 68 (e.g., the imaging assembly 62) of FIG. 2, the light sensor assembly 368 of FIG. 3, or the first and/or second light sensor assemblies 468a,b of FIG. 4. One or more fluid volume images 504 may be associated with a single fluid volume. For example, the first and second light sensor assemblies 468a,b each may provide an image of a particular fluid volume. Additionally or alternatively, a fluid volume image 504 may comprise a composite image depicting two or more representations of a fluid volume. Further, a fluid volume image 504 may comprise a three-dimensional model or other representation of the fluid volume.

Figure 9:
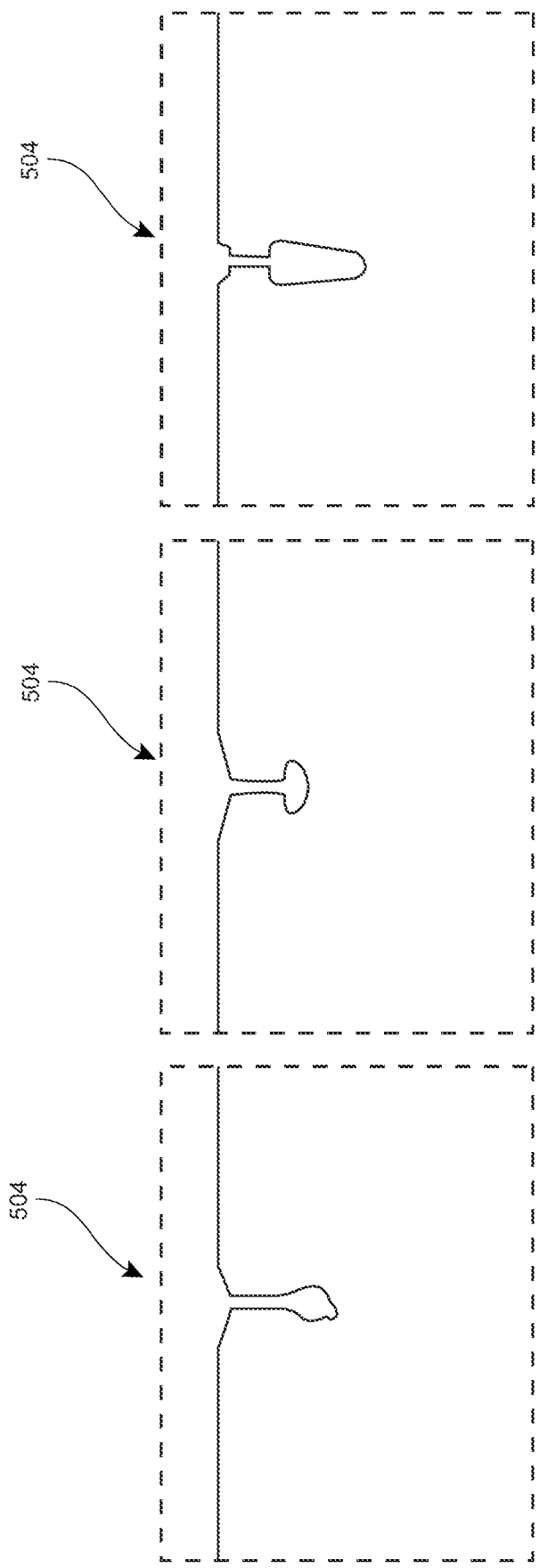
FIG. 9A illustrates an exemplary image of in-flight fluid during dispensing according to an embodiment of the present disclosure.
FIG. 9B illustrates another exemplary image of in-flight fluid during dispensing according to an embodiment of the present disclosure.
FIG. 9C illustrates yet another exemplary image of in-flight fluid during dispensing according to an embodiment of the present disclosure.
Figure 10:
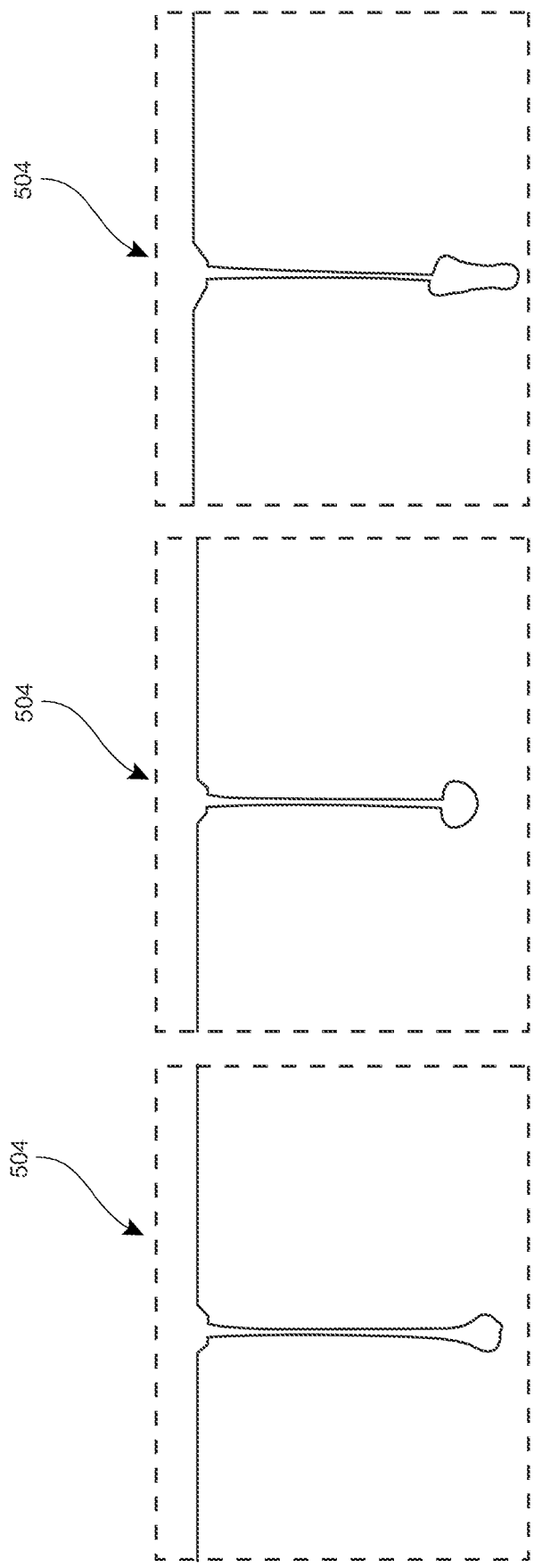
FIG. 10A illustrates yet another exemplary image of in-flight fluid during dispensing according to an embodiment of the present disclosure.
FIG. 10B illustrates yet another exemplary image of in-flight fluid during dispensing according to an embodiment of the present disclosure.
FIG. 10C illustrates yet another exemplary image of in-flight fluid during dispensing according to an embodiment of the present disclosure.

Exemplary images 504 are depicted in FIGS. 9A-10C. FIGS. 9A-10C show fluids in-flight during a dispensing stage. FIGS. 9A-10C depict various images that are associated with different results of dispensing. For example, the dispensing of the fluid as shown in FIG. 9A results in an accumulation of fluid on the dispensing nozzle; the dispensing of the fluid as shown in FIG. 9B results in a preferred application of the fluid; and dispensing of the fluid as shown in FIG. 9C results in formation of satellites on the substrate. It will be appreciated that the three images depicted in FIGS. 9A-9C are exemplary and are not intended to limit this disclosure. Another exemplary set of images 504 are depicted in FIGS. 10A-10C, which the dispensing fluid in flight during a different dispensing stage than what is shown in FIGS. 9A-9C. FIGS. 10A-10C depict images of in-flight fluid that is further from the nozzle than the fluid depicted in FIGS. 9A-9C. Similarly to FIGS. 9A-9C, FIGS. 10A, 10B, and 10C depict dispensing of the fluid that results in accumulation of fluid on the dispensing nozzle, a preferred application of fluid, and formation of satellites on the substrate, respectively.

A fluid volume image 504 generally comprises a side view of the subject fluid volume while it is in-flight between the dispensing device nozzle and the substrate. As used throughout the specification, "in-flight" may refer to a dispensed fluid volume that has broken contact with the nozzle but not yet contacted the substrate. "In-flight" may also refer to a dispensed fluid volume that has not yet broken contact with the nozzle and thus may describe a fluid volume that is in contact with the nozzle but not the substrate. "In-flight" may further refer to a dispensed fluid volume that has initially contacted the substrate but yet still remains in contact with the nozzle, such as when an extended line of fluid is deposited on the substrate instead of a dot.

Figure 11:
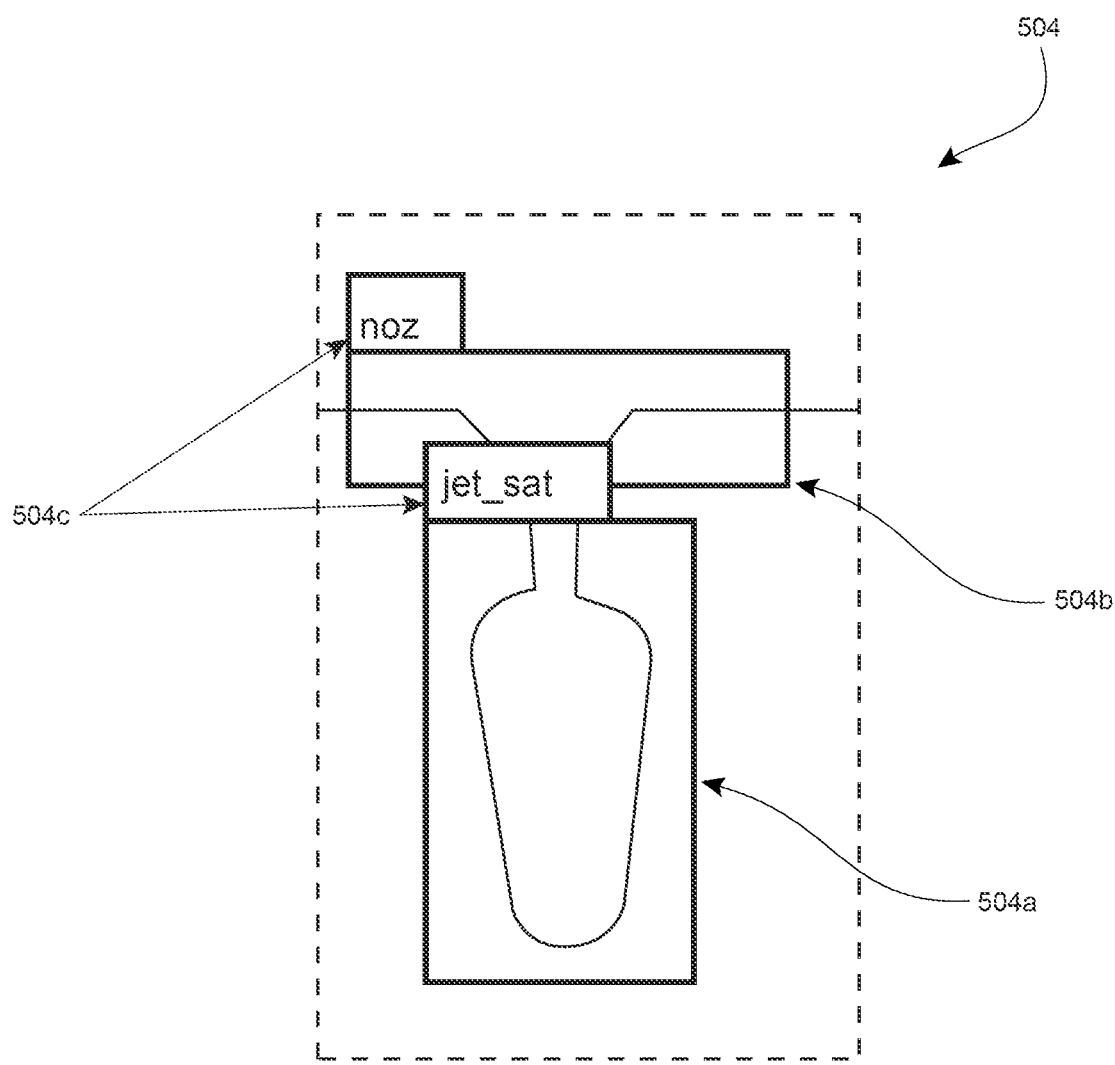
FIG. 11 illustrates an exemplary image of in-flight fluid during dispensing showing bounding boxes according to another embodiment of the present disclosure.

The fluid volume images 504 may be subject to pre-input processing, which may enhance the usefulness of the image as input to the machine learning tool 510. For example, a fluid volume image 504 may be processed to identify (e.g., via bounding box and label) various portions of the fluid volume image 504. Referring, for example, to FIG. 11, a portion of the fluid volume image 504 may be identified as a portion 504a depicting the fluid volume, and another portion of the fluid volume image 504 may be identified a portion 504b depicting the nozzle, so as to facilitate analysis of the fluid volume itself. An identified portion 504a or 504b of the fluid volume image 504 may be labeled accordingly, such as via metadata to the image or within the image itself via a visible textual or graphical label 504c. Further, the fluid volume image 504 may be cropped to remove at least some portions of the fluid volume image 504 that do not depict the fluid volume, for example, to remove the portions 504b that depict the nozzle.

Operating Parameters Associated with Dispensed Volumes

The sample dispensing data 502 preferably includes one or more operating parameters 506, as noted above, that are associated with the dispensing valve from which the fluid volume was dispensed. The operating parameters 506 may be those of the dispensing assembly 14 or other component of the dispensing system 10 of FIG. 1A, including the example dispensing assembly 200 of FIGS. 1B and 1C. Example operating parameters 506 include the speed and/or a stroke length of a needle, a valve stem, and/or other movable element (e.g., the valve element 214 of FIG. 1B) configured to engage a valve seat to dispense the fluid volume. In some aspects, the operating parameters 506 may include ambient temperature, temperature of the fluid being dispensed (e.g. temperature of the fluid as it is being dispensed, temperature of the fluid in flight, and/or temperature of the fluid as it is deposited onto the substrate), substrate temperature, and/or the like. Example operating parameters 506 may also relate to an actuation profile, such as actuation timing, the stroke length of the actuator (e.g., the piezoelectric drive module 216 of FIG. 1C, the drive pin 236 of FIG. 1B, etc.), and/or other actuation parameters. Other example operating parameters 506 may include an opening velocity, a closing velocity, an open time, and/or the like of the dispensing nozzle and valve. Example operating parameters 506 include the frequency that the dispensing nozzle and valve are open and shut (i.e., the frequency at which fluid volumes are dispensed), the fluid pressure of the fluid as it is provided to the dispensing device, and the temperature of the dispensing nozzle. Operating parameters 506 may relate to the movement of the dispensing device, particularly while dispensing a fluid volume, including placement, velocity, and directionality of the dispensing device while dispensing. Operating parameters 506 may also relate to a hardware configuration, including the size of the needle, valve stem, or other movable element configured to engage the valve seat to dispense the fluid volume and the size of the nozzle (e.g., the diameter of the nozzle's exit opening). Other operating parameters 506 may relate to a characteristic of the fluid itself, include density, viscosity, types of solids, and solids content. Moreover, the operating parameters 506 may include one or more physical characteristics of the fluid and/or the dispensing system 10.

Sample Dispensing Data

The sample dispensing data 502 may include the images 504 and/or the parameters 506 as mentioned above and may comprise various other sorts of data that may be used as input to the machine learning tool 510. For example, the weight of a deposited volume of fluid (e.g., on the substrate) may be included with the sample dispensing data 502. A scale or similar measurement device may be incorporated with the dispensing calibrations stations 58, 358, or 458 of FIGS. 2, 3, and 4, respectively, to measure the weight of the deposited fluid volume. Various other characteristics of the fluid volume may be included in the sample dispensing data 502. For example, the fluid volume images 504 may be processed, to at least some extent, to determine one or more characteristics of the fluid volume and those determined characteristics may be input to the machine learning tool 510. In some aspects, the one or more characteristics determined from the fluid volume images 504 and the fluid volume images 504 may be both input to the machine learning tool 510. In other aspects, the characteristics determined from the fluid volume images 504 may be input to the machine learning tool 510 but the fluid volume images 504 themselves are not. Example fluid volume characteristics that may be included in the sample dispensing data 502 are velocity, width, diameter, length, shape, directionality, dot velocity, stream width, dot shape, dot mass, dot volume, nozzle cleanliness, damage inspection, cartridge identification, dot size, accumulation detection, satellite count, placement accuracy, dot metrics, intra-distance values, inter-distance values, two-dimensional clustering, three-dimensional clustering, and/or the like.

Figure 6:
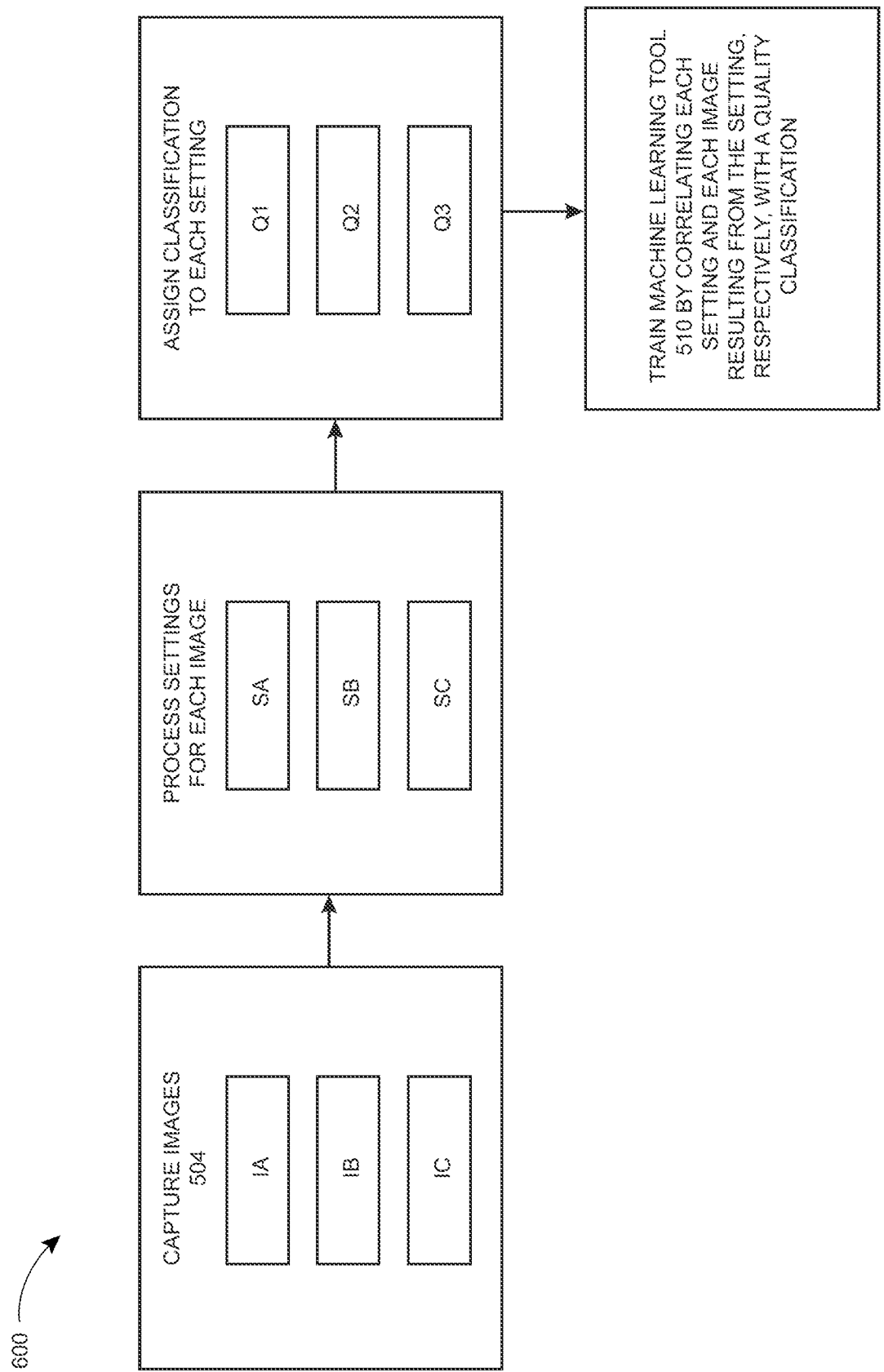
FIG. 6 illustrates a simplified experiment for training a machine learning tool according to an embodiment of the present disclosure.

Simplified Training Experiment for Machine Learning Tool (FIG. 6)

As shown in FIG. 6, a simplified experiment 600 could be conducted wherein sets of images IA, IB and IC of dispense volumes A, B and C, respectively, are captured for each of the settings SA, SB and SC associated with the dispense volumes A, B and C. In this experiment, setting SA could be a slow pin speed, setting SB could be a fast pin speed and setting SC could be a medium pin speed. The pin speed is the speed of the needle valve element 214 as it moves downwardly to contact the valve seat 252 in FIG. 1B to eject, or jet, the dispensed volume from the valve.

In this experiment, for each of the dispense volumes A, B and C, an operator looks at the dispensed volume or group of dispensed volumes on the substrate and determines if there is accumulation of dispensed material on the nozzle. The operator then assigns a quality rating to the dispense volumes, such as Q1, Q2, and Q3. In machine learning terms, Q1, Q2, and Q3 are classes of a classification system. These quality ratings of the classification system might be for example: Q1 indicates satellites produced on the substrates, Q2 indicates accumulation of material on the nozzle and Q3 indicates a good dispense with no satellites or accumulation.

For example:

For dispense volume A, the operator might assign quality classification Q2 which would then be associated with images IA and settings SA. Note that classification Q2 relates to a dispensing result in which accumulation of material is present on the nozzle, and the setting SA is related to the slow pin speed. As such, the system will be trained to associate accumulation of material on the nozzle as shown in an image with slow pin speed.

For dispense volume B, the operator might assign quality classification Q1 which would then be associated with images IB and settings SB. Classification Q1 refers to a dispensing result in which satellites are produced on the substrate, and setting SB refers to the fast pin speed. As such, the system will be trained to associate satellites produced on the substrate as shown in an image with fast pin speed.

For dispense volumes C, the operator might assign quality classification Q3, which would then be associated with images IC and settings SC. Classification Q3 indicates a good dispense (i.e. no defects), and the setting SC refers to the medium pin speed. As such, in this simplified example, the system will be trained to associate dispensing of fluid devoid of satellites or accumulations on the nozzle, as shown in an image, with medium pin speed.

Referring to the exemplary depictions in FIGS. 9A-9C, and relating to the experiment 600 described above, FIG. 9A may be classified as Q2, for example, depicting an accumulation of dispensed material on the nozzle. FIG. 9B may be classified as Q3, indicating a good dispense without defects (i.e. without satellites and without accumulation on the nozzle). FIG. 9C may be classified as Q1, depicting an image that results in formation of satellites on the substrate. Exemplary FIGS. 10A, 10B, and 10C may similarly be classified as Q2, Q3, and Q1, respectively. It will be understood that FIGS. 9A-10C are exemplary and are not intended to limit the application of the experiment 600 described above.

The input to the machine learning tool 510 may comprise a plurality of different types of input, or input different nodes. For example, one input node may comprise the fluid volume image 504. An input node may comprise a portion of the fluid volume image 504 rather than the full captured image of the fluid volume. In an aspect, an input node may comprise metadata associated with the fluid volume image 504. Such metadata may identify certain portions of the fluid volume image 504, including the fluid volume itself and/or the nozzle within the image. The metadata may comprise labels for the identified portions of the fluid volume image 504. An input node of the machine learning tool 510 may also comprise an operating parameter 506. An input node may also comprise other characteristics of the fluid volume, such as weight, velocity, width, diameter, length, shape, and directionality.

The defect classifications predicted by the machine learning tool 510 can be characterized as the classification output 520 of the tool 510 as previously mentioned. The classification output 520 may comprise generally a classification of the fluid volume (e.g., the fluid volume represented in the fluid volume image 504). The classification output 520 may be realized as the output layer of the machine learning tool 510. The output layer may comprise one or more output nodes. Each output node may correspond to a candidate (i.e., potential) fluid volume classification. In an aspect, the classification output 520 may comprise a plurality of classifications (e.g., indicate a plurality of output nodes). Each classification may indicate a probability for the classification. Thus, the classification output 520 may define a probability distribution (e.g., a categorical distribution) for the potential classifications of the fluid volume. In other aspects, the classification output 520 may comprise a single classification (e.g., identify a single output node). The single classification may also indicate a probability for the classification. The single classification in the classification output 520 may be the classification with the highest probability out of the candidate classifications of the plurality of output nodes.

A classification may indicate a defect or other characterization of the fluid volume. For example, a classification may indicate an accumulation defect, a satellite defect, a misplacement defect, a liquid volume (quantity) defect, shape defect, or dimension defect. An accumulation defect may indicate that a fluid volume was negatively impacted by accumulated fluid at the nozzle, caused accumulation of fluid at the nozzle, or both. A satellite defect may indicate that the fluid volume is associated with (e.g., causes) satellite fluid volumes on the substrate. A misplacement defect may indicate that the fluid volume was misplaced on the substrate. A liquid volume (quantity) defect may indicate that the volume (quantity, e.g., milliliters or microliters) of the fluid volume deposited on the substrate is outside of a volume tolerance. A shape defect may indicate that the shape of the deposited fluid volume is outside of a shape tolerance, such as with respect to the proportions of two or more dimensions. A dimension defect may indicate that one or more dimensions of the fluid volume deposited on the substrate are outside of a dimension tolerance. For example, a resultant dot of fluid on the substrate may have a diameter above or below a diameter tolerance or a line of fluid may have a width above or below a line width tolerance. In some aspects, a classification may indicate a composite defect reflecting two or more defects, such as both misplacement and accumulation defects. A classification may also indicate a lack of defect. That is, a no-defect classification may indicate that the fluid volume was deposited on the substrate within specified tolerances.

A classification may be further associated with one or more operating parameters 506 of the dispensing system. Such operating parameter 506 may be an operating parameter that causes, at least in part, or is correlated with the associated defect. Thus a classification may comprise a defect and one or more operating parameters 506. For example, a classification may indicate a satellite defect and the valve needle velocity operating parameter. The satellite defect indicated in such a classification may be a particular type of satellite defect or exhibit certain traits that are, for example, known to be caused by, at least in part, a high valve needle velocity. A second classification may indicate a satellite defect and a valve open time operating parameter. This second satellite defect may be a satellite defect caused by, at least in part, or correlated with too long or too short of a valve open time.

A classification may be yet further associated with one or more characteristics of the fluid volume, such as one or more of those characteristics identified in the fluid volume images 504. Such characteristics may cause, at least in part, or correlate with the associated defect indicated in the classification. Accordingly, a classification may comprise a defect of the fluid volume and one or more characteristics of the fluid volume (as well as the one or more operating parameters described above). For example, a classification may indicate a misplacement defect and a directionality characteristic of the in-flight fluid volume that is known to correlate with misplacement defects. A second example classification may also indicate a misplacement defect but instead a velocity characteristic of the in-flight fluid volume that is known to correlate with misplacement defects. Accordingly, the output nodes of the machine learning tool 510 may cover various combinations and sub-combinations of one or more defects, one or more operating parameters, and one or more characteristics of the fluid volume (as well as a no-defect case).

With further reference to FIG. 5 which shows a process for training the machine learning tool, the process may be modified to include using images of previously constructed or known examples of defect classifications 524. The training classifications 524 may be determined through analysis (manual and/or automated) of the images of the fluid volume that is deposited on the substrate. For example, image analysis may be performed on a top-view image of the substrate with the deposited subject fluid volume, as well as other deposited fluid volumes, such as those of other training iterations. The image analysis may identify, for example, the presence of satellites on the substrate, any mis-shaped or mis-dimensioned fluid volume deposits, and any misplaced fluid volume deposits. The training may comprise comparing the classification output 520 produced by the machine learning tool 510 to the known defect classifications 524 that are exhibited in the images that were provided to the machine learning tool 510. The comparison may be with respect to a single classification of the classification output 520, such as the classification with the highest probability.

The comparison of the known defect classifications 524 with the classification output 520 may yield an error, which can be quantified. The error may serve as a measure generally reflecting whether the machine learning tool 510 is sufficiently "trained" for contemplated uses or not. For example, the error may be outside acceptable bounds, indicating that the machine learning tool 510 is insufficiently trained for the contemplated use.

Based on the error, a determination may be made to revise the machine learning tool 510, preferably so that the revised (second) machine learning tool is configured to determine a more accurate classification output 520 than the previous iteration of the machine learning tool 510. Whether to revise the machine learning tool 510 and/or perform an additional training iteration may be determined based on a threshold or threshold range. For example, the error may be compared to the threshold or threshold range. If the error satisfies the threshold or threshold range, the machine learning tool 510 may be deemed acceptable for use as the accepted machine learning tool 510. Conversely, if the error does not satisfy the threshold or threshold range, an additional training iteration may be performed.

In an additional training iteration for the revised second machine learning tool, sample dispensing data 502 for a second fluid volume may be provided as input to the revised second machine learning tool. Based on the input sample dispensing data 502 for a second fluid volume, the revised second machine learning tool may determine a second classification output (e.g., a further instance of the classification output 520) for the second fluid volume. Based on the known classification of the second fluid volume from the training classifications 524, a second error may be determined. The second error may be evaluated in view of the known classification of the second fluid volume to determine if further training iterations should be performed or if the revised second machine learning tool should be adopted as the accepted machine learning tool 510.

In an embodiment, the training iterations for the machine learning tool 510 may be performed a pre-determined number of times. As such, a further training iteration is performed after determining the error for each iteration until the pre-determined number is reached. The revised machine learning tool 510 may be provided additional sample dispensing data and corresponding known training classifications for a further round of training iterations except that the error for each iteration will be evaluated to determine if the latest revised machine learning tool is performing acceptably. Finally, a third set of sample dispensing data and corresponding known training classifications are provided to the final version of the machine learning tool for verification of the final version's performance. No further revisions to the machine learning tool are made based on the third set of sample dispensing data.

Use of a Trained Machine Learning Tool

Figure 7:
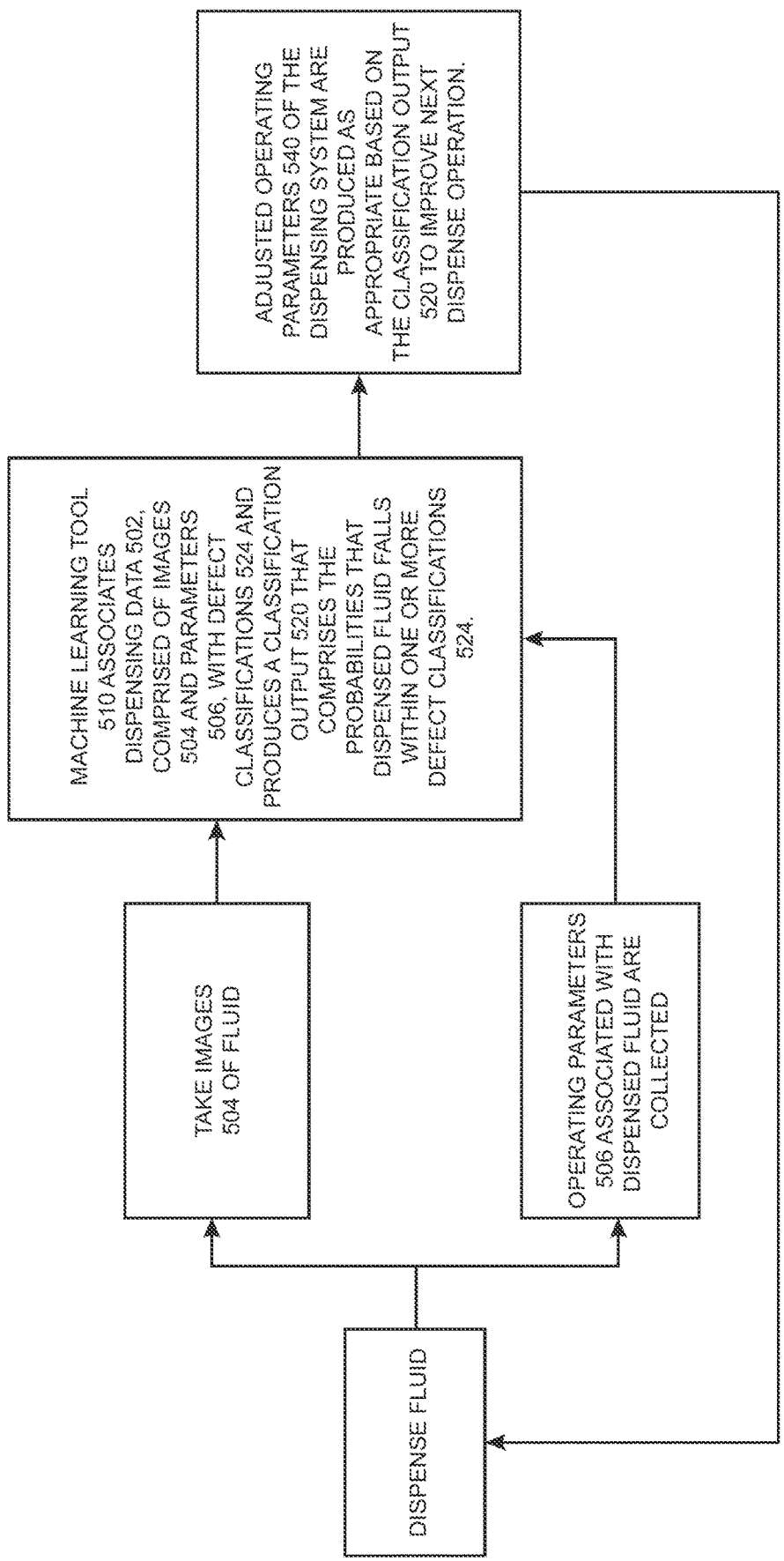
FIG. 7 illustrates an example flow diagram for one method for using a trained machine learning tool in production according to an embodiment of the present disclosure.

As shown in FIG. 7, a closed loop process for using a machine learning tool 510 in production starts with a valve of a dispensing device being opened and closed to dispense a portion of viscous fluid from a nozzle of the dispensing device. As described above, images 504 are taken of the dispensed volume in flight, and possibly of the dispensing nozzle. In addition, operating parameters 506 associated with dispensing the volume are collected in the system. These images and parameters are input into the machine learning tool 510 and are used to predict defect classifications 524 for the dispense volume based on the training of machine previously done using the process shown in FIG. 5. The predicted defect classifications comprise the classification output 520. The classification output 520 might be for example that there is a 90% probability that the dispensed volume is in class Q1 (satellite defect), and a 10% probability that the dispense volume is in class Q3 (no defect). In the next step, parameters of the dispensing system are adjusted as appropriate based on the classification output 520 provided by the machine learning tool to produce adjusted operating parameters 540. In this case, for example, since there is a 90% chance of a satellite defect, and since the machine learning tool has been taught to associate high pin speed (i.e. high valve needle speed) with satellite defects, the parameters that affect the speed of the valve needle will be adjusted to reduce the speed of the valve needle. A new volume of material is then dispensed with the adjusted parameters 540 and the cycle repeats itself. In this way, the machine learning tool 510 can be used in production to automatically correct for defects that are detected based on the training previously given to the machine learning tool 510.

In more detail, dispensing data 502 indicating one or more dispensed fluid volumes (including in-flight fluid volume images 504, operating parameters 506, and/or other associated data) is provided. Dispensing data 502 associated with a fluid volume is input to the machine learning tool 510 to determine a classification output 520 indicating a classification (e.g., a defect, if any) of the fluid volume. Based on various known relationships between (input) dispensing system operating parameters and (output) dispensed fluid volume characteristics and defects (the input/output relationships) and the classification output 520, one or more operating parameters (i.e., values of said operating parameters) of the dispensing system are adjusted (the adjusted operating parameters 540). Under the adjusted operating parameters 540, a second fluid volume is dispensed. The second fluid volume is reflected in the new dispensing data 502, such as an image of the second fluid volume in-flight and the operating parameters, including the adjusted operating parameters 540, according to which the second fluid volume was dispensed. The dispensing data 502 for the second fluid volume may be the basis for a further iteration of the closed-loop control, and so forth.

The dispensing data 502 may indicate one or more fluid volumes dispensed by a dispensing device (e.g., the dispensing assembly 14 with dispensing nozzle 16 of FIG. 1A). The fluid volumes associated with the dispensing data 502 may be fluid volumes dispensed on a substrate in a production environment and/or in a production mode. Additionally or alternatively, the fluid volumes associated with the dispensing data 502 may be fluid volumes dispensed at a service station or in a service mode. The fluid volumes may be dispensed at a service station of a dispensing platform, which is adjacent to the work area of the platform where materials are dispensed in production onto substrates. At the service station, the materials may be dispensed on a substrate or in a receptacle. The dispensing data 502 may generally indicate aspects of a fluid volume prior to it being deposited on the substrate. For example, the dispensing data 602 may exclude on-substrate images of fluid volumes. The dispensing data 502 may also include or exclude on-substrate characteristics of the fluid volumes, such as on-substrate dimensions, shape, weight, satellites, and placement.

The dispensing data 502 may include in-flight fluid volume images 504. The fluid volume images 504 may have been captured by the light sensor assembly 68 (e.g., the imaging assembly 62) of FIG. 2, the light sensor assembly 368 of FIG. 3, or the first and/or second light sensor assemblies 468a,b of FIG. 4. The fluid volume images 504 may comprise one or more images of the subject fluid volume while it is in-flight to the substrate. The fluid volume images 504 of the subject fluid volume may comprise a first image captured by a first camera and a second image captured from a different angle by a second camera, for example. The fluid volume images 504 of the subject fluid volume may comprise a composite image with two or more representations of the fluid volume at different intervals in time, as another example.

The fluid volume images 504 may undergo pre-processing to determine additional data for the fluid volumes and/or enhance the usefulness of the fluid volume images 504. For example, the portion of an image containing the fluid volume may be identified and labeled as such (e.g., within the image or as metadata). The portion of an image containing the nozzle may be identified and labeled as such (e.g., within the image or as metadata). As another example, at least some portions of an image that do not contain the fluid volume or the nozzle may be cropped from the image.

The dispensing data 502 may include the operating parameters 506 according to which the subject fluid volume (and/or other fluid volumes) were dispensed. The operating parameters 506 may be those of the dispensing assembly 14 or other component of the dispensing system 10 of FIG. 1A, including the example dispensing assembly 200 of FIGS. 1B and 1C.

Example operating parameters 506 include the velocity and/or a stroke length of a needle, valve stem, or other movable element (e.g., the valve element 214 of FIG. 1B) configured to engage a valve seat to dispense the fluid volume. Example operating parameters 506 may also relate to an actuation profile, such as actuation timing, the stroke length of the actuator (e.g., the piezoelectric drive module 216 of FIG. 1C, the drive pin 236 of FIG. 1B, etc.), and/or other actuation parameters. Other example operating parameters 506 include an opening velocity, closing velocity, and open time of the dispensing nozzle and valve. Example operating parameters 506 include the frequency that the dispensing nozzle and valve are open and shut (i.e., the frequency at which fluid volumes are dispensed), the fluid pressure of the fluid as it is provided to the dispensing device, and the temperature of the dispensing nozzle. Operating parameters 506 may also relate to a hardware configuration, including the size of the needle, valve stem, or other movable element configured to engage the valve seat to dispense the fluid volume and the size of the nozzle (e.g., the diameter of the nozzle's exit opening). Other operating parameters 506 may relate to a characteristic of the fluid itself, include density, rheology, viscosity, types of solids, solids content, and/or the like.

The dispensing data 502 may further include other data, such as one or more characteristics of a fluid volume while it is in-flight. Such in-flight characteristics of the fluid volume may be determined based on one or more fluid volume images 504 of the fluid volume. Characteristics of the fluid volume may include velocity, width, diameter, length, shape, and directionality. The in-flight characteristics of the fluid volume may be provided as input to the machine learning tool 510 in addition to the fluid volume images 504 or in place of the fluid volume images 504.

The machine learning tool 510 may receive at least a portion of the dispensing data 502 for the subject fluid volume as an input. The machine learning tool 510 may comprise the accepted machine learning tool 510 of FIG. 5 resulting from the training process described in relation to FIG. 5. The input nodes of the input layer of the machine learning tool 510 may comprise the at least a portion of the dispensing data 502 for the subject fluid volume. As such, the input nodes may comprise one or more of the fluid volume images 504 of the subject fluid volume, one or more of the operating parameters 506 according to which the subject fluid volume was dispensed, and other data, such as image metadata labeling certain portions of the fluid volume images 504 as the fluid volume and/or the nozzle. The input nodes of the machine learning tool 510 may also comprise one or more in-flight characteristics of the subject fluid volume.

Based on the input dispensing data 502 for the subject fluid volume, the machine learning tool 510 determines the classification output 520 for the subject fluid volume. The classification output 520 may comprise one or more classifications for the subject fluid volume. For example, the classification may indicate an on-substrate defect of the deposited subject fluid volume, such as a satellite defect, a misplacement defect, a liquid volume (quantity) defect, shape defect, or dimension defect, as well as an accumulation defect. A classification may also indicate one or more operating parameters that are associated with (e.g., cause and/or correlate with) the indicated defect classification. A classification may also indicate one or more in-flight characteristics of the subject fluid volume that are associated with (e.g., cause and/or correlate with) the indicated defect classification.

The classification output 520 may comprise a plurality of classifications. The plurality of classifications may comprise a plurality of candidate classifications for the subject fluid volume. Each candidate classification may indicate a probability that the subject fluid volume belongs to the candidate classification. Thus, the classification output 520 may comprise a probability distribution (e.g., a categorical distribution) of the candidate classifications for the subject fluid volume. The classification output 520 may comprise a subset of the plurality of candidate classifications. For example, the classification output 520 may comprise the candidate classifications having a probability satisfying a threshold probability. The classification output 520 may comprise a single classification. The single classification may be the candidate classification with the highest probability. The classification output 520 may also indicate that the subject fluid volume resulted in (or would have) an acceptable deposit of fluid volume on the substrate: a "no-defect" classification. That is, the on-substrate characteristics (or projections thereof) of the deposited subject fluid volume are all within acceptable tolerance ranges.

One or more adjusted operating parameters 540 are determined based on the classification output 520 and the input/output relationships. The input/output relationships represent one or more functional relationships between one or more operating parameters of the dispensing system (the "input" to the dispensing system) and one or more in-flight or on-substrate characteristics of a fluid volume (the "output" of the dispensing system). Such characteristic represented in the input/output relationships may include a defect of the fluid volume, particularly a defect to the fluid volume once deposited to the substrate (e.g., a satellite defect, a misplacement defect, a liquid volume (quantity) defect, shape defect, or dimension defect) or an accumulation defect. For example, the input/output relationships may indicate the effect that a particular change to an operating parameter has to one or more characteristics of a resultant dispensed fluid volume. Conversely, the input/output relationships may indicate one or more operating parameters (or changes thereto) of the dispensing system that may be implemented to effectuate one or more fluid volume characteristics. The input/output relationships may be realized as one or more functions, such as mathematical functions.

The input/output relationships may comprise multivariate relationships between one or more operating parameters of the dispensing system and one or more characteristics of the fluid volume. For example, the input/output relationships may comprise relationships between two or more operating parameters and one or more fluid volume characteristics. The input/output relationship may comprise relationships between one or more operating parameters and two or more fluid volume characteristics. The input/output relationships may comprise relationships between two or more operating parameters and two or more fluid volume characteristics. Further, the input/output relationships may comprise relationships between one or more operating parameters and one or more other operating parameters (e.g., a relationship between valve stem/needle velocity and nozzle opening width). Yet further, the input/output relationships may comprise relationships between one or more fluid volume characteristics and one or more other fluid volume characteristics (e.g., a relationship between a volume defect and a satellite defect, a relationship between an accumulation defect and a misplacement defect, or a relationship between an in-flight velocity characteristic and a shape defect).

It will be noted that the adjusted operating parameters 540 may not differ, per se, from the operating parameters (e.g., the operating parameters 506) used to dispense the subject fluid volume. Thus, the "adjusted" operating parameters 540 may not represent any adjustments at all. For example, the classification output 520 may indicate a "no defect" classification for the fluid volume. As such, the closed-loop dispensing process control may determine that the dispensing system should carry on operations as-is, rather than implementing one or more changes to the dispensing system's operating parameters.

The adjusted operating parameters 540 may be applied to dispense one or more additional fluid volumes (represented by element 650). That is, one or more additional fluid volumes may be dispensed using the adjusted operating parameters 540. One or more additional iterations of the flow diagram of FIG. 7 may be performed to implement the closed-loop control of the dispensing system using the machine learning tool 510. For example, a second volume of fluid may be dispensed according to the initial adjusted operating parameters 540. Additional dispensing data 502 may be determined based on the second dispensed fluid volume. At least a portion of the additional dispensing data representing the second fluid volume may be input to the machine learning tool 510 to determine a corresponding classification output 520 for the second fluid volume. Based on the classification output for the second fluid volume and the input/output relationships, a second one or more adjusted operating parameters 540 may be determined. Those adjusted operating parameters, in turn, may be used to dispense a third fluid volume. Dispensing data 502 for the third fluid volume may be input to the machine learning tool 510 to determine a corresponding classification output 520, and so forth. The first, second, and third fluid volumes need not be consecutive fluid volumes. Rather, iterations of the closed-loop dispensing process control may be performed at various interspersed intervals (e.g., with respect to time or fluid volumes).

Several benefits may be realized by use of the closed-loop dispensing system control described herein. These benefits may be largely realized without substantial operator intervention or manual recalibration. As one example benefit, the dispensing process control and resultant adjusted operating parameters may be determined according to the actual conditions under which dispensing operations are performed, as opposed to those conditions at, for example, a manufacturer's calibration or test facility. For example, the temperature or humidity at a production facility may differ from that at the calibration or test facility. In addition, a dispensing system may be calibrated under an assumed operating schedule (e.g., a default number of operational hours per day) while an actual operating schedule may differ. Furthermore, the closed-loop dispensing process control described herein provides control adaptability under various changes. For example, the dispensing system may be moved between buildings at a facility, causing various changes to the operating environment. The seasons of the year may also cause shifts in the operating environment. A new operating schedule may call for an increase or a decrease to per-day operating time. The dispensing system may be applied to a different manufacturing or assembly process that requires various adjustments, for example, to the size and placement of fluid volumes on the substrate. Rather than a manual recalibration process, the closed-loop dispensing process control may determine any defects caused by any of the aforementioned changes and automatically adjust operating parameters over one or more iterations to preferably eliminate or minimize such defects.

Figure 8:
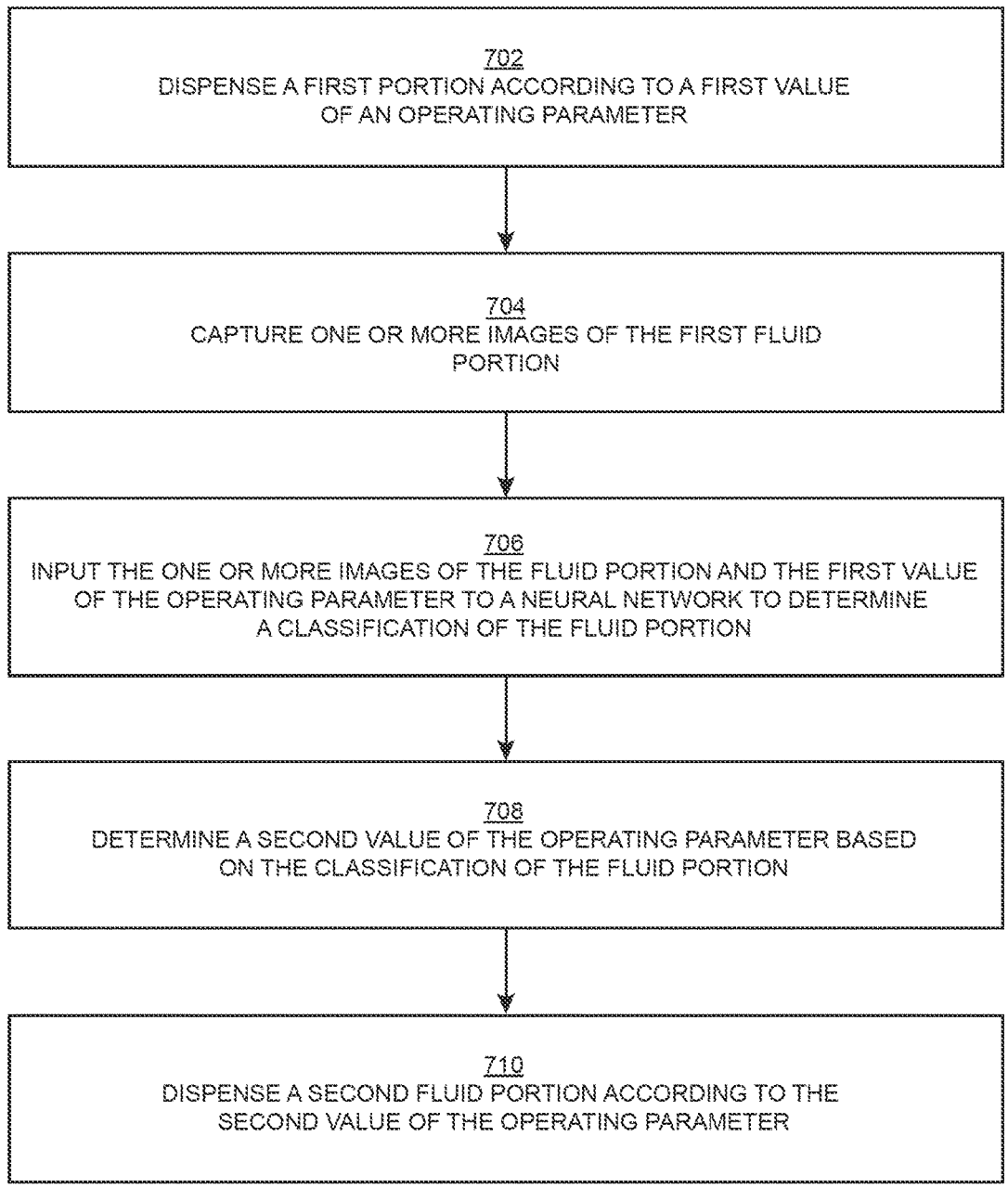
FIG. 8 illustrates an example flow diagram according to an embodiment of the present disclosure.

FIG. 8 illustrates a flow chart of a method 700 for a closed-loop dispensing process control using a machine learning tool for operating a dispensing device for dispensing volumes of fluid (e.g., viscous fluid). Such dispensing device may comprise the dispensing system 10 of FIG. 1A generally or, more specifically, the dispensing assembly 14 of FIG. 1A. A fluid volume may form a dot or a line once deposited to a substrate (or if it would have been deposited to a substrate in the case of a receptacle instead of a substrate). Dispensing volumes of fluid (e.g., an open and close of the nozzle valve) may occur during movement of the dispensing device and nozzle and the volumes of fluid may be discontinuous. Additionally or alternatively, a substrate may move relative to the dispensing device and nozzle.

At step 702, a fluid portion or volume (e.g., a volume of viscous fluid) is dispensed by the dispensing device according to a first value of an operating parameter of the dispensing device. Dispensing the fluid portion or volume may comprise opening and closing a valve of a nozzle of the dispensing device to dispense the fluid volume from the nozzle. An operating parameter may comprise, for example, valve stem/needle velocity, valve stem/needle stroke length, actuation timing, actuation stroke length, nozzle valve opening velocity, nozzle valve closing velocity, nozzle valve open time, nozzle valve open-and-close frequency, dispensing frequency, fluid pressure, nozzle temperature, needle/valve stem size, nozzle opening width, dispensing device placement, dispensing device movement velocity while dispensing, or dispensing device directionality while dispensing. Operating parameters of the dispensing device are further described in relation to the operating parameters 506 and dispensing data 502 of FIG. 7.

At step 704, one or more images of the fluid are captured. The one or more images may be side-view images of the fluid volume while it is in-flight from the nozzle. The one or more images may be captured by a camera, for example. The one or more images may be captured by the light sensor assembly 68 (e.g., the imaging assembly 62) of FIG. 2, the light sensor assembly 368 of FIG. 3, or the first and/or second light sensor assemblies 468a,b of FIG. 4. The one or more images may comprise the fluid volume images 504 of FIG. 5 or 7. As noted, the one or more images may be processed to identify a portion of an image corresponding to the fluid and/or a portion of an image corresponding to the nozzle. Such portions may be identified within the image, as metadata to the image, or other form of data (e.g., the dispensing data 502 of FIG. 7). The one or more images may be cropped to eliminate at least some portions of the captured one or more images that do not show the fluid volume.

Additionally or alternatively, one or more characteristics of the fluid may be determined. The one or more characteristics of the portion, or volume, of fluid may be in-flight characteristics of the fluid volume. The one or more characteristics of the fluid volume may be determined based on the one or more images. Such characteristics may include velocity, width, diameter, length, shape, or directionality of the fluid volume.

At step 706, the one or more images of the fluid volume are input to a machine learning tool (e.g., the machine learning tool 510 of FIG. 7). The first value of the operating parameter may be also provided to the machine learning tool along with the one or more images. Based on the inputting the one or more images and the first value of the operating parameter to the machine learning tool, a classification (e.g., the classification output 520 of FIG. 7) of the fluid volume is determined. The machine learning tool may determine the classification, for example.

The classification of the fluid volume may be indicative of a characteristic of the fluid volume. For example, the classification may be indicative of a defect of the fluid volume. The defect may be an on-substrate defect, such as a satellite defect, a misplacement defect, a liquid volume (quantity) defect, shape defect, or dimension defect. The defect may be another type of defect, such as an accumulation defect. A characteristic of the fluid volume indicated by the classification may be additionally or alternatively an in-flight characteristic of the fluid volume, such as velocity, width, diameter, length, shape, or directionality. A classification may be indicative of both one or more defects (on-substrate or accumulation) and one or more in-flight characteristics. Thus, for example, a classification may indicate that the fluid volume suffers from a shape defect related to velocity (generally or the fluid volume's specific velocity). Additionally or alternatively, a classification may be indicative of both one or more defects and one or more operating parameters including the aforementioned operating parameter (generally or the first value thereof). For example, the classification may indicate that the fluid volume suffers from a misplacement defect related to nozzle valve open time (generally or the actual nozzle valve open time according to which the fluid volume was dispensed).

The classification of the fluid volume may comprise a probability of the characteristic of the fluid volume. The classification of the fluid volume may be based on two or more candidate classifications of the fluid volume. The two or more candidate classifications may correspond to the output nodes of the output layer of the machine learning tool. Each of the two or more candidate classifications may comprise a probability of the characteristic of the fluid volume. The classification of the fluid volume may comprise the candidate classifications having the greatest probability. The classification may be based on a probability distribution of the two or more candidate classifications.

At step 708, a second value of the operating parameter (e.g., the adjusted operating parameters 540) is determined based on the classification of the fluid volume. The second value of the operating parameter may be the same or different from the first value of the operating parameter. The second value of the operating parameter may be further based on one or more known relationships (the input/output relationships) between the operating parameter and the characteristic (e.g., defect) of the fluid volume indicated by the classification. For example, the one or more known relationships may comprise a relationship between a dimension defect indicated in the classification and a valve stem velocity operating parameter used to dispense the fluid volume. Further, the one or more relationships may indicate that a decrease to valve stem velocity from the current first value corresponds to a reduced probability of dimension defects. Thus, a decreased valve stem velocity operating parameter may be determined for the second value of the operation parameter.

Determining the second value of the operating parameter may be based on a comparison of a characteristic of the fluid volume (indicated by the classification) to a range. The range may comprise a threshold range in which values outside of the threshold range are considered a defect with respect to that characteristic (or an associated characteristic or set of characteristics). For example, an out-of-range on-substrate dimension may indicate an on-substrate shape defect and the second value of the operating parameter may be determined accordingly. Conversely, a characteristic of the fluid volume indicated by the classification may be within the bounds of the threshold range and, thus, the second value of the operating parameter may be determined to equal the first value of the operating parameter (i.e., no change).

In an aspect, a second operating parameter of the dispensing device may be used to determine the classification of the fluid volume. That is, a first value of the second operating parameter of the dispensing device may be input to the machine learning tool. The classification is determined further based on the inputting the first value of the second operating parameter to the machine learning tool. A classification may be further indicative of the second operating parameter. For example, a classification may indicate a misplacement defect related to valve stem velocity (a first operating parameter) and valve stem stroke length (a second operating parameter).

In an aspect, a second characteristic of the fluid volume may be determined. The second characteristic may be determined as part of the classification of the fluid volume, i.e., the classification indicates both the first and second characteristics of the fluid volume. Additionally or alternatively, the second characteristic may be determined independently, such as via analysis of the one or more images of the in-flight fluid volume. The second characteristic may comprise an in-flight characteristic of the fluid volume. The second characteristic may comprise at least one of a directionality, dimension, shape, liquid volume, or velocity of the fluid volume. The second value of the operating parameter may be further based on the second characteristic of the fluid volume.

The one or more known relationships between the operating parameter and the characteristic of the fluid volume may comprise a multi-variate relationship between at least two of the operating parameter, the second operating parameter, the characteristic of the fluid volume, or the second characteristic of the fluid volume. The second value of the operating parameter may be further based on said multi-variate relationship.

At step 710, a second fluid volume is dispensed by the dispensing device according to the second value of the operating parameter. Dispensing the second fluid volume may comprise opening and closing the valve of the nozzle of the dispensing system. The second fluid volume may be dispensed to a same substrate as the first fluid volume or a different substrate. The second fluid volume may be dispensed at a pre-determined interval (e.g., with respect to time or number of fluid volumes dispensed) from the first fluid volume.

In furtherance of the closed-loop dispensing process control, one or more images of the second fluid volume may be captured and/or one or more in-flight characteristics of the second fluid volume may be determined. The one or more images of the second fluid volume and/or the one or more in-flight characteristic of the second fluid volume may be input to the machine learning tool to determine a classification (e.g., a defect and/or other characteristic(s)) of the second fluid volume. Based on the classification of the second fluid volume and the known relationships between the operating parameter and the defect and/or other characteristic(s) of the second fluid volume, a third value of the operating parameter may be determined. The closed-loop dispensing process control may be continued using the third value of the operating parameter in a similar manner as the first and second values of the operating parameter. If a classification indicates a "no-defect" classification, the closed-loop control may conclude. Alternatively, the closed-loop control may continue, but using the same value of the operating parameter to dispense a subsequent fluid volume. Continuation of the closed-loop control may be desirable where an iteration of the loop is performed at regular intervals for continued monitoring and correction of the dispensing operation.

In an aspect, at least a portion of the closed-loop dispensing process control may be used to determine a predicted time of failure of at least one component of the dispensing device. Additionally or alternatively, the predicted time of failure may be for the dispensing device as a whole. The at least one component of the dispensing device may be associated with an operating parameter that is used as input to the machine learning tool. The at least one component may be associated with the classification (and/or characteristic thereof) determined by the machine learning tool. For example, wear to a valve needle and/or valve seat may relate to a liquid volume (quantity) defect. Over multiple iterations of the closed-loop control, a probability of a classification may be tracked. A trend in the probabilities over the multiple iterations may be identified and this trend may be used to determine a predicted time of failure of the at least one component.

Using the above example of the valve needle and/or valve seat, wear to the valve needle and/or valve seat may prevent a complete seal from forming between the two. As this wear progresses, the liquid volume (quantity) of each dispensed fluid volume may likewise decline. As the liquid volume of the dispensed fluid volume declines over time, the probability that a captured image reflects a liquid volume defect (indicated by the classification) may rise. The trend exhibited by the probabilities of a liquid volume defect may be identified and form the basis for a predicted time of failure. The predicted time of failure may be for the valve needle, the valve seat, both the valve needle and valve seat, a nozzle comprising the valve needle and/or valve seat, or the dispensing device.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Recitation of ranges of values herein are merely intended to serve as a shorthand method of referring individually to each separate value falling within the range, unless otherwise indicated herein, and each separate value is incorporated into the specification as if it were individually recited herein.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of operating a dispensing device for dispensing viscous fluid, the dispensing device having a nozzle and a valve, the method comprising:
    opening and closing the valve to dispense a portion of viscous fluid from the nozzle according to a first value of an operating parameter of the dispensing device;
    capturing one or more images of the portion of viscous fluid;
    inputting the one or more images of the portion of viscous fluid and the first value of the operating parameter to a machine learning tool;
    determining, using the machine learning tool, a defect classification of the portion of viscous fluid based on the one or more images of the portion of viscous fluid and the first value of the operating parameter; and
    determining a second value of the operating parameter based on the defect classification of the portion of viscous fluid.

2. The method of claim 1, further comprising:
    dispensing a second portion of viscous fluid from the dispensing device according to the second value of the operating parameter of the dispensing device.

3. The method of claim 1, wherein the defect classification of the portion of viscous fluid is determined by the machine learning tool based a training of the machine learning tool to associate images of dispensed portions, and operating parameters associated with dispensed portions, with defect classifications.

4. The method of claim 3, wherein the defect classification of the portion of viscous fluid indicates a probability that the portion of viscous fluid belongs to the defect classification.

5. The method of claim 1, wherein the defect classification is indicative of a characteristic of the portion of the viscous fluid, the method further comprising:
    comparing the characteristic of the portion of viscous fluid to a range,
    wherein the determining the second value of the operating parameter is based on the characteristic of the portion of viscous fluid being outside of the range.

6. The method of claim 5, wherein the characteristic of the portion of viscous fluid comprises a defect characteristic of the portion of viscous fluid on a substrate.

7. The method of claim 6, wherein the defect characteristic is associated with at least one of a misplacement of the portion of viscous fluid on the substrate, one or more satellite portions of viscous fluid on the substrate and associated with the portion of viscous fluid, a dimension of the portion of viscous fluid on the substrate, a liquid portion of the portion of viscous fluid on the substrate, or a weight of the portion of viscous fluid on the substrate.

8. The method of claim 3, wherein the defect classification of the portion of viscous fluid is indicative of a defect characteristic of the portion of viscous fluid associated with accumulation of viscous fluid at the nozzle.

9. The method of claim 3, wherein the second value of the operating parameter is further based on a known relationship between the operating parameter and a characteristic of the portion of viscous fluid.

10. The method of claim 3, further comprising:
    inputting a first value of a second operating parameter of the dispensing device to the machine learning tool,
    wherein the defect classification of the portion of viscous fluid is further based on the first value of the second operating parameter.

11. The method of claim 10, further comprising:
    determining a second characteristic of the portion of viscous fluid, wherein the second value of the operating parameter is further based on the second characteristic of the portion of viscous fluid.

12. The method of claim 11, wherein the second value of the operating parameter is further based on a known multivariate relationship between at least two of the operating parameter, the second operating parameter, the characteristic of the portion of viscous fluid, or the second characteristic of the portion of viscous fluid.

13. The method of claim 11, wherein the second characteristic of the portion of viscous fluid comprises at least one of a directionality, a dimension, a shape, a liquid volume, or a velocity.

14. The method of claim 3, further comprising:
    based on one or more additional portions of viscous fluid dispensed by the dispensing device and associated images input to the machine learning tool, determining one or more respective classifications of the one or more additional portions of viscous fluid; and
    based on the one or more respective classifications of the one or more additional portions of viscous fluid, determining a predicted time of failure of at least one component of the dispensing device.

15. The method of claim 14,
    wherein the defect classification of the portion of viscous fluid and the one or more respective classifications of the one or more additional portions of viscous fluid each comprise a probability of the respective classification, and
    wherein the determining the predicted time of failure comprises determining a trend of the probabilities of the respective classifications of the portion of viscous fluid and the one or more additional portions of viscous fluid.

16. The method of claim 1, wherein the operating parameter of the dispensing device comprises at least one of a valve stem velocity, a needle velocity, a valve stem stroke length, a needle stroke length, an actuation timing, an actuation stroke length, a nozzle valve opening velocity, a nozzle valve closing velocity, a nozzle valve open time, a nozzle valve open-and-close frequency, a dispensing frequency, a fluid pressure, a nozzle temperature, a needle size, a valve stem size, a width of a nozzle opening, dispensing device placement, dispensing device movement velocity while dispensing, or dispensing device directionality while dispensing.

17. The method of claim 2, wherein the opening and closing of the valve occurs during movement of the nozzle and the portion of viscous fluid and the second portion of viscous fluid are discontinuous.

18. A method of operating a dispensing device for dispensing viscous fluid, the dispensing device having a nozzle and a valve, the method comprising:
opening and closing the valve to dispense a portion of viscous fluid from the nozzle according to a first value of an operating parameter of the dispensing device;
determining, based on data from a sensor, a characteristic of the portion of viscous fluid dispensed from the dispensing device;
inputting the characteristic of the portion of viscous fluid and the first value of the operating parameter to a machine learning tool;
determining, using the machine learning tool, a defect classification of the portion of viscous fluid based on the characteristic of the portion of viscous fluid and the first value of the operating parameter; and
determining a second value of the operating parameter based on the defect classification of the portion of viscous fluid.

19. The method of claim 18, wherein the sensor comprises a camera configured to capture one or more images of the portion of viscous fluid, the data from the sensor comprising the one or more images of the portion of viscous fluid.

20. The method of claim 18, wherein the sensor comprises a scale configured to measure at a weight the portion of viscous fluid, the data from the sensor comprising the weight of the portion of viscous fluid.

21. The method of claim 18, wherein the defect classification of the portion of viscous fluid is determined by the machine learning tool based a training of the machine learning tool to associate images of dispensed portions, and operating parameters associated with dispensed portions, with defect classifications.

22. The method of claim 18, wherein the defect classification of the portion of viscous fluid is indicative of a defect characteristic of the portion of viscous fluid on a substrate.

23. The method of claim 22, wherein the defect characteristic is associated with at least one of a misplacement of the portion of viscous fluid on a substrate, one or more satellite portions of viscous fluid on a substrate and associated with the portion of viscous fluid, a dimension of the portion of viscous fluid on a substrate, a liquid volume of the portion of viscous fluid on a substrate, or a weight of the portion of viscous fluid on a substrate.

24. The method of claim 18, wherein the defect classification of the portion of viscous fluid is indicative of a defect characteristic of the portion of viscous fluid associated with accumulation of viscous fluid at the nozzle.

25. The method of claim 18, wherein the second value of the operating parameter is further based on a known relationship between the operating parameter and a characteristic of the portion of viscous fluid indicated by the defect classification of the portion of viscous fluid.

26. The method of claim 18, further comprising:
inputting a first value of a second operating parameter of the dispensing device to the machine learning tool, wherein the defect classification of the portion of viscous fluid is further based on the first value of the second operating parameter.

27. The method of claim 26, further comprising:
determining a second characteristic of the portion of viscous fluid, wherein the second value of the operating parameter is further based on the second characteristic of the portion of viscous fluid.

28. The method of claim 27, wherein the second value of the operating parameter is further based on a known multivariate relationship between at least two of the operating parameter, the second operating parameter, the characteristic of the portion of viscous fluid, or the second characteristic of the portion of viscous fluid.

29. The method of claim 18, wherein the characteristic of the portion of viscous fluid comprises at least one of a directionality, a dimension, a shape, a liquid volume, or a velocity.

30. The method of claim 18, further comprising:
based on one or more additional portions of viscous fluid dispensed by the dispensing device and associated characteristics input to the machine learning tool, determining one or more respective classifications of the one or more additional portions of viscous fluid; and
based on the one or more respective classifications of the one or more additional portions of viscous fluid, determining a predicted time of failure of at least one component of the dispensing device.

31. The method of claim 30, wherein the defect classification of the portion of viscous fluid and the one or more respective classifications of the one or more additional portions of viscous fluid each comprise a probability of the respective classification, and
wherein the determining the predicted time of failure comprises determining a trend of the probabilities of the respective classifications of the portion of viscous fluid and the one or more additional portions of viscous fluid.

32. The method of claim 18, wherein the operating parameter of the dispensing device comprises at least one of a valve stem velocity, a needle velocity, a valve stem stroke length, a needle stroke length, an actuation timing, an actuation stroke length, a nozzle valve opening velocity, a nozzle valve closing velocity, a nozzle valve open time, a nozzle valve open-and-close frequency, a dispensing frequency, a fluid pressure, a nozzle temperature, a needle size, a valve stem size, a width of a nozzle opening, dispensing device placement, dispensing device movement velocity while dispensing, or dispensing device directionality while dispensing.

33. The method of claim 18, wherein the opening and closing of the valve occurs during movement of the nozzle and the portions of viscous fluid are discontinuous.

34. A dispensing system comprising:
a camera arranged to capture one or more images of a portion of viscous fluid dispensed by a dispensing device; and
a controller configured to generate one or more signals to:
open and close a valve of the dispensing device to dispense the portion of viscous fluid from the dispensing device according to a first value of an operating parameter of the dispensing device;
capture the one or more images of the portion of viscous fluid using the camera;
input the one or more images of the portion of viscous fluid and the first value of the operating parameter to a machine learning tool;

determine, using the machine learning tool, a defect classification of the portion of viscous fluid based on the one or more images of the portion of viscous fluid and the first value of the operating parameter; and determine a second value of the operating parameter based on the defect classification of the portion of viscous fluid.

35. The dispensing system of claim 34, wherein the controller is further configured to generate a signal to:

dispense a second portion of viscous fluid from the dispensing device according to the second value of the operating parameter of the dispensing device.

36. The dispensing system of claim 34, wherein the defect classification of the portion of viscous fluid is determined by the machine learning tool based a training of the machine learning tool to associate images of dispensed portions, and operating parameters associated with dispensed portions, with defect classifications.

37. The dispensing system of claim 36, wherein classification of the portion of viscous fluid is indicative of a characteristic of the portion of viscous fluid and the classification of the portion of viscous fluid is indicative of a probability of the characteristic of the portion of viscous fluid.

38. The dispensing system of claim 37, wherein the controller is further configured to generate a signal to:

compare the characteristic of the portion of viscous fluid to a range, wherein the determining the second value of the operating parameter is based on the characteristic of the portion of viscous fluid being outside of the range.

39. The dispensing system of claim 37, wherein the characteristic of the portion of viscous fluid comprises a defect characteristic of the portion of viscous fluid on a substrate.

40. The dispensing system of claim 39, wherein the defect characteristic is associated with at least one of a misplacement of the portion of viscous fluid on the substrate, one or more satellite portions of viscous fluid on the substrate and associated with the portion of viscous fluid, a dimension of the portion of viscous fluid on the substrate, a liquid portion of the portion of viscous fluid on the substrate, or a weight of the portion of viscous fluid on the substrate.

41. The dispensing system of claim 37, wherein the classification of the portion of viscous fluid is indicative of a defect characteristic of the portion of viscous fluid associated with accumulation of viscous fluid at a nozzle of the dispensing device.

42. The dispensing system of claim 37, wherein the second value of the operating parameter is further based on a known relationship between the operating parameter and the characteristic of the portion of viscous fluid.

43. The dispensing system of claim 37, wherein the controller is further configured to generate a signal to:

input a first value of a second operating parameter of the dispensing device to the machine learning tool, wherein the classification of the portion of viscous fluid is further based on the first value of the second operating parameter.

44. The dispensing system of claim 43, wherein the controller is further configured to generate a signal to:

determine a second characteristic of the portion of viscous fluid, wherein the second value of the operating parameter is further based on the second characteristic of the portion of viscous fluid.

45. The dispensing system of claim 44, wherein the second value of the operating parameter is further based on a known multi-variate relationship between at least two of the operating parameter, the second operating parameter, the characteristic of the portion of viscous fluid, or the second characteristic of the portion of viscous fluid.

46. The dispensing system of claim 44, wherein the second characteristic of the portion of viscous fluid comprises at least one of a directionality, a dimension, a shape, a liquid volume, or a velocity.

47. The dispensing system of claim 37, wherein the controller is further configured to generate a signal to:

based on one or more additional portions of viscous fluid dispensed by the dispensing device and associated images input to the machine learning tool, determine one or more respective classifications of the one or more additional portions of viscous fluid; and based on the one or more respective classifications of the one or more additional portions of viscous fluid, determine a predicted time of failure of at least one component of the dispensing device.

48. The dispensing system of claim 47, wherein the classification of the portion of viscous fluid and the one or more respective classifications of the one or more additional portions of viscous fluid each comprise a probability of the respective classification, and wherein the determining the predicted time of failure comprises determining a trend of the probabilities of the respective classifications of the portion of viscous fluid and the one or more additional portions of viscous fluid.

49. The dispensing system of claim 34, wherein the operating parameter of the dispensing device comprises at least one of a valve stem velocity, a needle velocity, a valve stem stroke length, a needle stroke length, an actuation timing, an actuation stroke length, a nozzle valve opening velocity, a nozzle valve closing velocity, a nozzle valve open time, a nozzle valve open-and-close frequency, a dispensing frequency, a fluid pressure, a nozzle temperature, a needle size, a valve stem size, a width of a nozzle opening, dispensing device placement, dispensing device movement velocity while dispensing, or dispensing device directionality while dispensing.

50. The dispensing system of claim 34, wherein the opening and closing of the valve occurs during movement of a nozzle of the dispensing device and the portions of viscous fluid are discontinuous.

* * * * *